United States Patent
Wemple et al.

(10) Patent No.: US 7,086,506 B2
(45) Date of Patent: Aug. 8, 2006

(54) PAD RETRACTION SPRING FOR A BRAKE SHOE ASSEMBLY AND A DISC BRAKE ASSEMBLY

(75) Inventors: Jonathan Wemple, Royal Oak, MI (US); George Traub, Whitmore Lake, MI (US)

(73) Assignee: Kelsey-Hayes Company, Livonia, MI (US)

(*) Notice: Subject to any disclaimer, the term of this patent is extended or adjusted under 35 U.S.C. 154(b) by 0 days.

(21) Appl. No.: 10/811,076

(22) Filed: Mar. 26, 2004

(65) Prior Publication Data

US 2004/0222053 A1 Nov. 11, 2004

Related U.S. Application Data

(63) Continuation of application No. PCT/US02/30539, filed on Sep. 25, 2002.

(60) Provisional application No. 60/324,705, filed on Sep. 25, 2001.

(51) Int. Cl.
*F16D 65/40* (2006.01)
(52) U.S. Cl. .................................. 188/73.38
(58) Field of Classification Search ............. 188/73.38, 188/18 A, 72.3
See application file for complete search history.

(56) References Cited

U.S. PATENT DOCUMENTS

| | | | |
|---|---|---|---|
| 3,135,360 A | | 6/1964 | Hodkinson |
| 4,243,123 A | * | 1/1981 | Watanabe ................ 188/73.38 |
| 4,408,681 A | * | 10/1983 | Oshima .................... 188/73.38 |
| 4,512,446 A | * | 4/1985 | Chuwman et al. ....... 188/73.38 |
| 4,533,023 A | * | 8/1985 | Carre et al. .............. 188/73.34 |
| 4,609,077 A | * | 9/1986 | Nakatsuhara ............ 188/73.38 |
| 4,629,037 A | * | 12/1986 | Madzgalla et al. ........ 188/71.8 |
| 4,673,065 A | * | 6/1987 | Gerard et al. ............ 188/73.38 |
| 4,905,796 A | * | 3/1990 | Schonenberger et al. 188/73.39 |
| 5,251,727 A | | 10/1993 | Loeffler et al. |
| 5,538,103 A | | 7/1996 | Rueckert et al. |

(Continued)

FOREIGN PATENT DOCUMENTS

DE    31 30 185    4/1982

(Continued)

OTHER PUBLICATIONS

Document Bibliography and Abstract for SE303680 from the European Patent Office website: http://v3.espacenet.com/textdoc?DB=EPODOC&IDX=SE303680, printed Jun. 28, 2004.

(Continued)

*Primary Examiner*—Robert A. Siconolfi
(74) *Attorney, Agent, or Firm*—MacMillan, Sobanski & Todd, LLC

(57) ABSTRACT

This invention relates to a pad spring for use in a disc brake assembly. According to one embodiment of the present invention, the disc brake assembly comprises an anchor bracket adapted to be secured to a vehicle component; a brake caliper adapted to be secured to the anchor bracket; an inboard friction pad and an outboard friction pad carried by the disc brake assembly and adapted to be disposed on opposite axial sides of an associated brake rotor; actuation means for selectively moving the inboard and outboard friction pads into frictional engagement with the rotor; and a pad spring carried by at least one end of one of the friction pads for moving the friction pads from engagement with the rotor when the actuation means is released; wherein the pad spring includes a first portion for applying a first retraction force and a second portion for applying a second retraction force which is different from the first retraction force.

12 Claims, 26 Drawing Sheets

U.S. PATENT DOCUMENTS 5,549,181 A * 8/1996 Evans .................. 188/72.3
5,947,233 A * 9/1999 Kobayashi et al. ........ 188/72.3
6,269,915 B1 * 8/2001 Aoyagi .................. 188/73.38
6,527,090 B1 * 3/2003 Barillot et al. ........... 188/73.38

FOREIGN PATENT DOCUMENTS

| DE | 43 01 621 | 8/1993 |
|---|---|---|
| DE | 196 50 592 | 6/1998 |
| EP | 0 560 146 | 9/1993 |
| GB | 1 425 269 | 2/1976 |
| GB | 3514137 A1 * | 3/1986 |
| GB | 2 166 822 | 6/1986 |
| GB | 2172068 A * | 9/1986 |
| GB | 2 257 483 | 1/1993 |
| JP | 52074774 A * | 6/1977 |
| SE | 303 680 | 9/1968 |
| WO | 93/15331 | 8/1993 |

OTHER PUBLICATIONS

Document Bibliography and Abstract for WO9315331 from the European Patent Office website: http://v3.espacenet.com/textdoc?DB=EPODOC&IDX=WO9315331, printed Jun. 28, 2004.

* cited by examiner

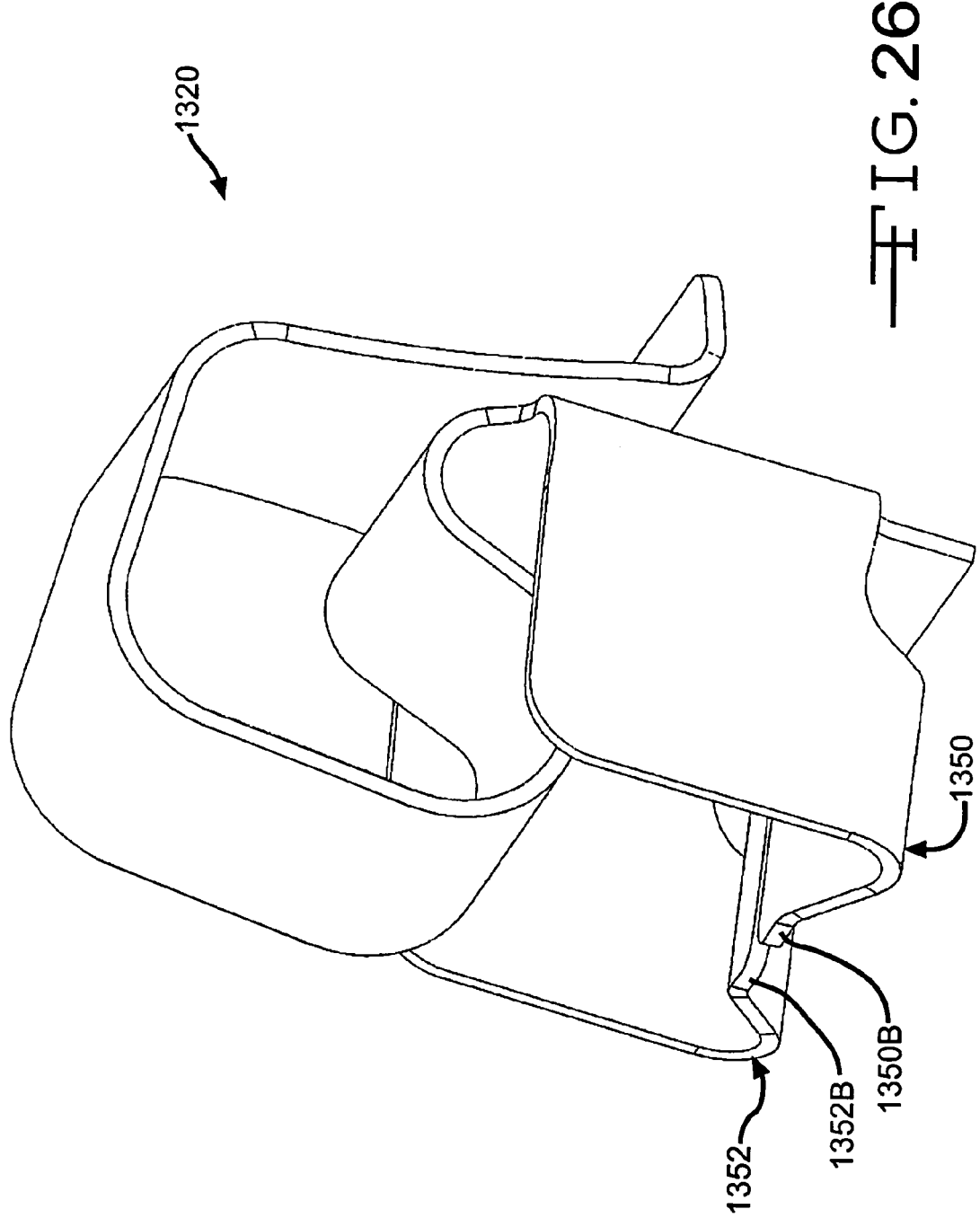

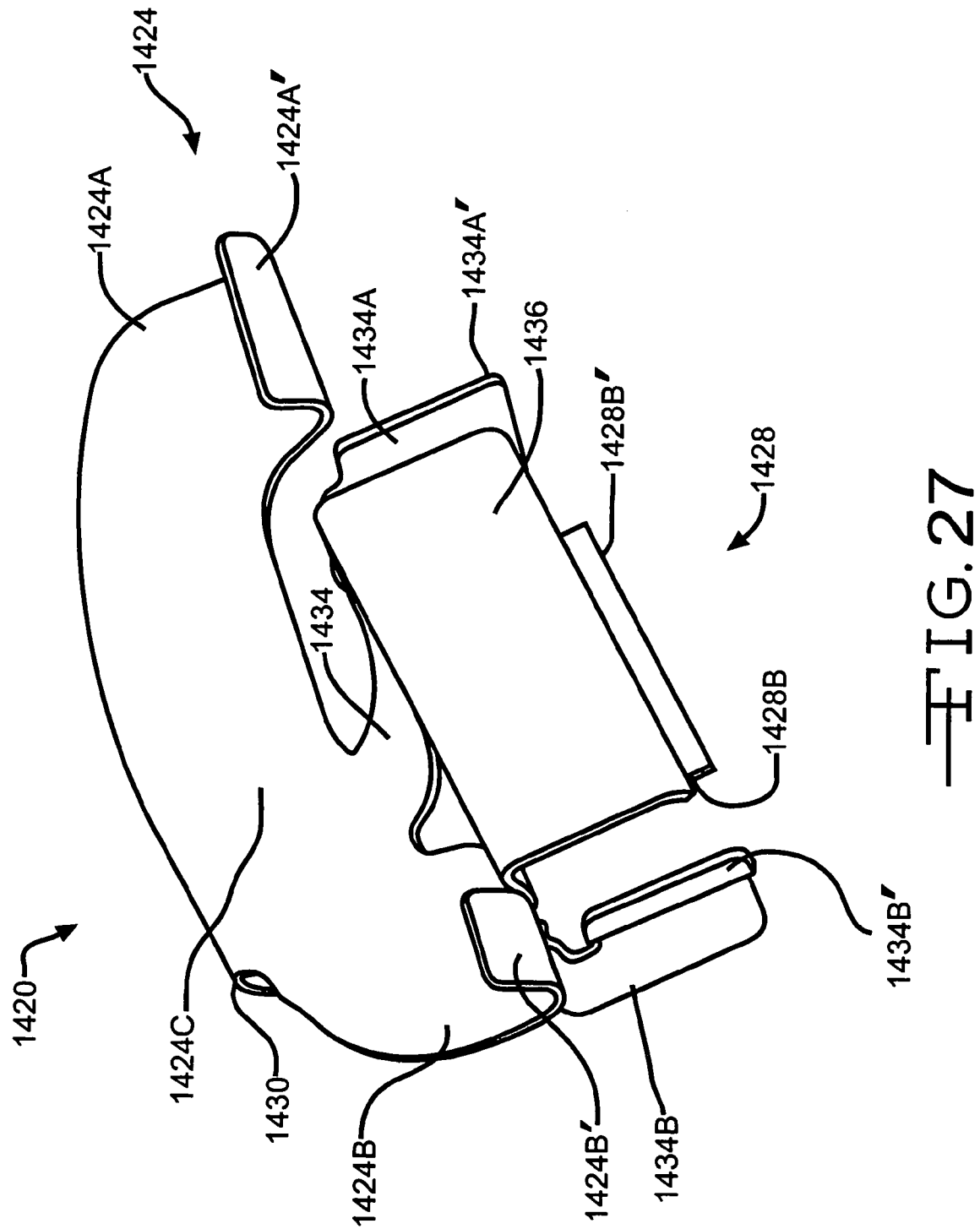

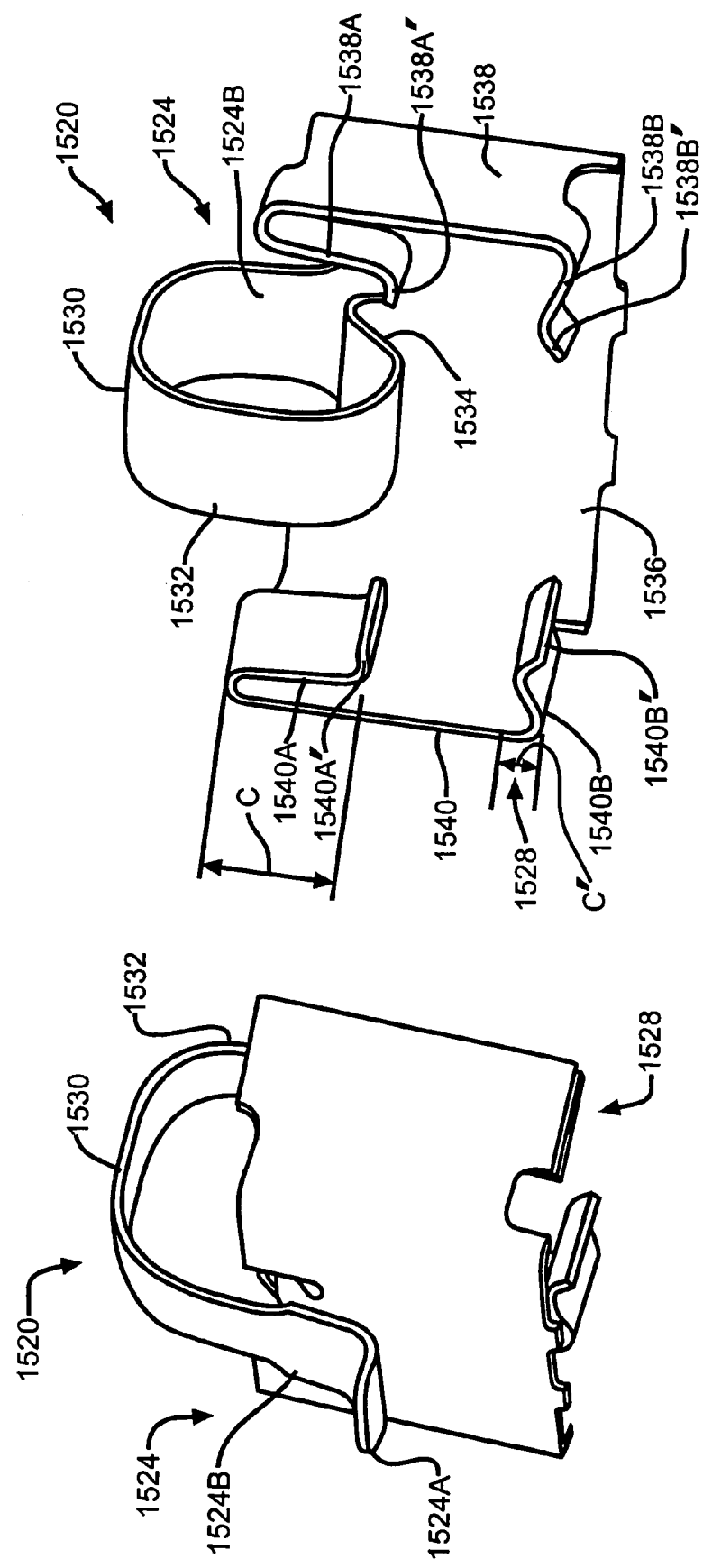

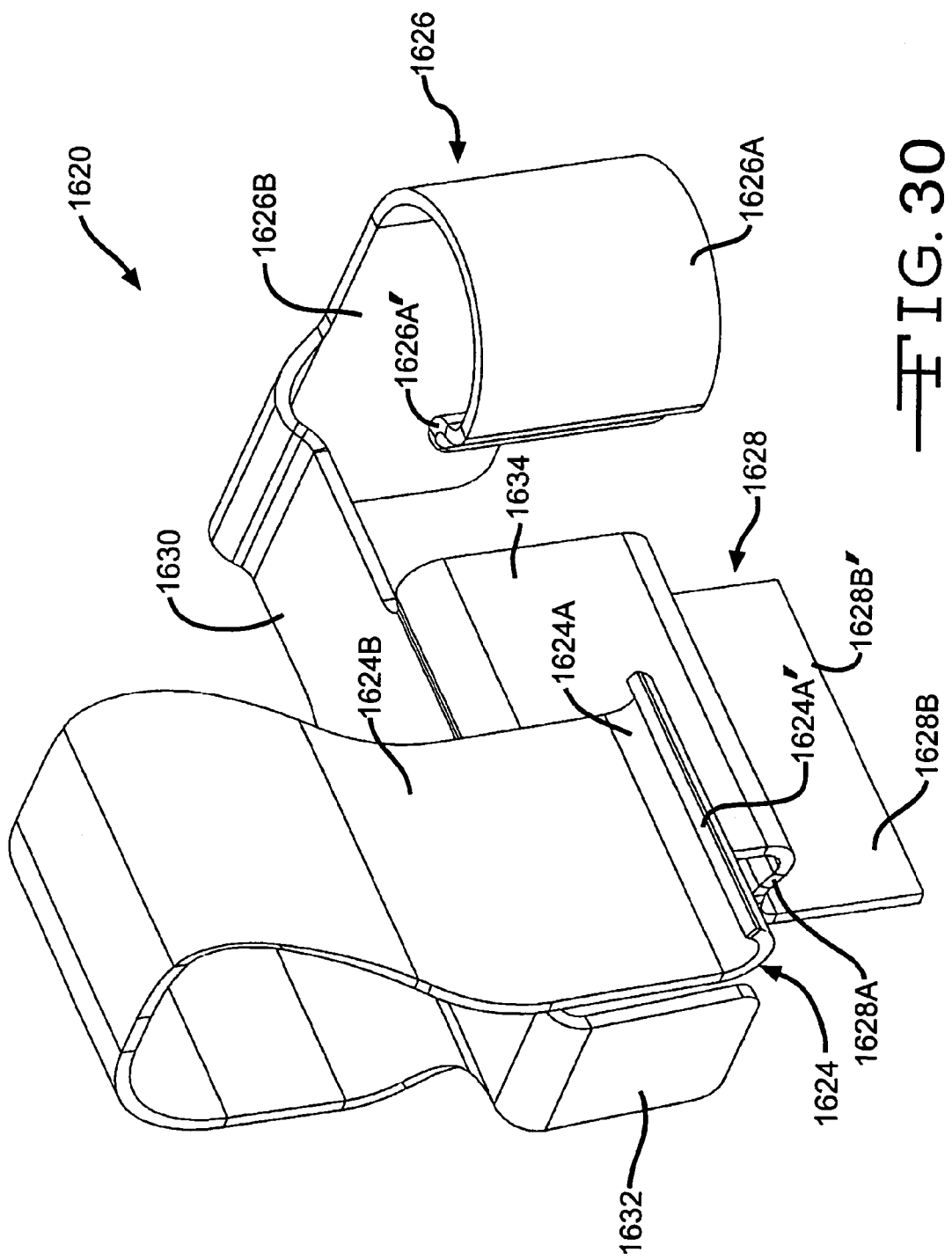

PAD RETRACTION SPRING FOR A BRAKE SHOE ASSEMBLY AND A DISC BRAKE ASSEMBLY

CROSS-REFERENCE TO RELATED APPLICATIONS

This application is a continuation of PCT/US02/30539, filed Sep. 25, 2002, which claims the benefit of U.S. Provisional Application Ser. No. 60/324,705, filed Sep. 25, 2001.

BACKGROUND OF THE INVENTION

This invention relates in general to vehicle disc brake assemblies and in particular to an improved structure for a pad spring for a brake shoe assembly adapted for use in such a vehicle disc brake assembly.

Most vehicles are equipped with a brake system for retarding or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are typically actuated by hydraulic or pneumatic pressure generated when an operator of the vehicle depresses a brake pedal. The structures of these drum brake assemblies and disc brake assemblies, as well as the actuators therefor are well known in the art.

A typical disc brake assembly includes an anchor bracket which is secured to a fixed, non-rotatable component of the vehicle. A pair of brake shoes are supported on the anchor bracket for sliding movement relative thereto. The brake shoes have respective friction pads which are disposed on opposite sides of a rotor. The rotor, in turn, is connected to the wheel of the vehicle for rotation therewith. To effect braking action, the brake shoes are moved inwardly toward one another so as to frictionally engage the opposed sides of the rotor. Such frictional engagement causes retarding or stopping of the rotational movement of the rotor and, therefore, the wheel of the vehicle in a controlled manner.

To accomplish this, the disc brake assembly further includes a caliper assembly for selectively moving the brake shoes into frictional engagement with the brake rotor. The caliper assembly typically includes guide pins or other components to slidably support a caliper housing relative to the fixed anchor bracket. The caliper housing is generally C-shaped, having an inboard leg disposed adjacent the inboard brake shoe and an outboard leg disposed adjacent to the outboard brake shoe. One or more hydraulically or pneumatically actuated pistons are provided in respective cylindrical recesses formed in the caliper inboard leg adjacent to the inboard brake shoe. When the brake pedal is depressed, the piston and the inboard leg of the caliper are urged apart from one another. Specifically, the piston is urged outwardly, while the outboard leg of the caliper is urged inwardly. As mentioned above, the piston is disposed adjacent to the inboard brake shoe and, therefore, urges it outwardly toward the inner side of the rotor. Because the caliper is slidably mounted on the pins of the anchor bracket, the caliper outboard leg (and, thus, the outboard brake shoe disposed adjacent thereto) are urged inwardly toward the outer side of the rotor. As result, the brake shoes frictionally engage the opposed sides of the rotor.

Frequently, an annular roll-back seal is provided within the cylindrical recess in contact with the outer surface of the piston. The roll-back seal is conventional in the art and performs several functions. First, the roll-back seal provides a seal to define the extent of the cylindrical recess within which the piston is disposed. Second, the roll-back seal is designed to retract the piston inwardly away from the rotor by a predetermined distance from the fully engaged position when the brake pedal is released after being depressed. To accomplish this, the roll-back seal frictionally engages the outer surface of the piston, resiliently resisting movement thereof when the brake pedal is depressed. Thus, when the brake pedal is released by the operator of the vehicle, the resilience of the roll-back seal causes the piston to retract within the cylindrical recess and out of contact with the inboard brake shoe.

With repeated usage, the friction pads of the brake shoes wear and become increasingly thinner. When this occurs, the piston and the caliper must move greater distances relative to one another to effect the same braking action as when the friction pads were new. Despite this increased distance of movement of the piston in the outboard direction, it is desirable that the roll-back seal retract the piston only by the same predetermined distance away from the rotor in the inboard direction. Thus, known roll-back seals are designed to accommodate increased movement of the piston in the outboard direction when the brake pedal is depressed, but to retract the piston inwardly by approximately the same predetermined distance when the brake pedal is subsequently released.

Ideally, when the brake pedal is released, the brake shoes should also be spread apart from one another to prevent any incidental frictional engagement with the rotor. To accomplish this, it is known to provide the disc brake assembly with one or more retraction springs for moving the brake shoes apart from one another to prevent frictional engagement with the rotor when the brake pedal is released. For example, U.S. Pat. No. 4,364,455 to Oshima, U.S. Pat. No. 4,491,204 to Dirauf et al., U.S. Pat. No. 4,629,037 to Madzgalla et al., U.S. Pat. No. 4,658,938 to Thiel et al, U.S. Pat. No. 4,867,280 to Von Gruenberg et al., U.S. Pat. No. 4,940,119 to Kondo et al., U.S. Pat. No. 5,069,313 to Kato et al., U.S. Pat. No. 5,249,647 to Kobayashi et al., and U.S. Pat. No. 5,251,727 to Loeffler et al. all disclose disc brake assemblies which include a retraction spring structure. It is desirable that such retraction springs exert an amount of force which is large enough to urge the brake shoes apart from one another to prevent engagement with the rotor, but small enough not to overcome the roll-back seal to move the piston deeper within the associated cylindrical recess formed in the inboard leg of the caliper.

Unfortunately, when the friction pads of the brake shoes wear thinner as described above, conventional retraction springs are typically compressed to a greater extent when the friction pads of the brake shoes are worn than when they are new. The additional compression of known brake shoe retraction springs can result in the exertion of a force against the associated brake shoe which can overcome the roll-back seal and undesirably move the piston away from the rotor by a distance which is greater than the predetermined distance discussed above. U.S. Pat. No. 5,549,181 to Evans, a copy of which is attached hereto and the disclosure of which is incorporated herein, discloses a retractor clip which exerts a substantially uniform force on the brake shoes regardless of the amount of wear on the friction pads of the brake shoes.

SUMMARY OF THE INVENTION

This invention relates to a pad spring for use in a brake shoe assembly of a disc brake assembly and a disc brake assembly including such a brake shoe assembly. According to one embodiment of the present invention, the disc brake assembly comprises an anchor bracket adapted to be secured to a vehicle component; a brake caliper adapted to be secured to the anchor bracket; an inboard friction pad and an outboard friction pad carried by the disc brake assembly and adapted to be disposed on opposite axial sides of an associated brake rotor; actuation means for selectively moving the inboard and outboard friction pads into frictional engagement with the rotor; and a pad spring carried by at least one end of one of the friction pads for moving the friction pads from engagement with the rotor when the actuation means is released; wherein the pad spring includes a first portion for applying a first retraction force and a second portion for applying a second retraction force which is different from the first retraction force.

According to another embodiment of the present invention the disc brake assembly comprises: an anchor bracket adapted to be secured to a vehicle component; a brake caliper adapted to be secured to the anchor bracket; an inboard friction pad and an outboard friction pad carried by said disc brake assembly and adapted to be disposed on opposite axial sides of an associated brake rotor; actuation means for selectively moving the inboard and outboard friction pads into frictional engagement with the rotor; and a pad spring carried by at least one end of one of the friction pads for moving the friction pads from engagement with the rotor when said actuation means is released; wherein the pad spring permanently yields and applies a corresponding force from a geometrically decreasing spring rate as the lining of the friction pad wears.

According to yet another embodiment of the present invention the disc brake assembly comprises: an anchor bracket adapted to be secured to a vehicle component; a brake caliper adapted to be secured to the anchor bracket; an inboard friction pad and an outboard friction pad carried by the disc brake assembly and adapted to be disposed on opposite axial sides of an associated brake rotor; actuation means for selectively moving the inboard and outboard friction pads into frictional engagement with the rotor; and a pad spring carried by at least one end of one of the friction pads; wherein the pad spring is carried by the friction pad with a portion of the spring spaced apart at an angle from contact an adjacent surface of the friction pad in a normal position when the brake is not actuated.

According to yet a further embodiment of the present invention, the disc brake assembly comprises an anchor bracket adapted to be secured to a vehicle component; a brake caliper adapted to be secured to the anchor bracket; an inboard friction pad and an outboard friction pad carried by the disc brake assembly and adapted to be disposed on opposite axial sides of an associated brake rotor; actuation means for selectively moving the inboard and outboard friction pads into frictional engagement with the rotor; and a pad spring carried by at least one end of one of the friction pads for moving the friction pads from engagement with the rotor when the actuation means is released; wherein the pad spring is carried by the friction pad in an asymmetrical manner.

According to still yet a further embodiment of the present invention, the disc brake assembly comprises an anchor bracket adapted to be secured to a vehicle component; a brake caliper adapted to be secured to the anchor bracket; an inboard friction pad and an outboard friction pad carried by the disc brake assembly and adapted to be disposed on opposite axial sides of an associated brake rotor; actuation means for selectively moving the inboard and outboard friction pads into frictional engagement with the rotor; and at least one pad spring carried by the disc brake assembly and including a first end and a second end, the first end adapted to be secured to the anchor bracket and the second end adapted to be secured to an end of one of the friction pads for moving the friction pads from engagement with the rotor when the actuation means is released; wherein the pad spring is secured to the anchor bracket in a symmetrical manner.

According to another embodiment of the present invention the disc brake assembly comprises: an anchor bracket adapted to be secured to a vehicle component; a brake caliper adapted to be secured to the anchor bracket; an inboard friction pad and an outboard friction pad carried by said disc brake assembly and adapted to be disposed on opposite axial sides of an associated brake rotor; actuation means for selectively moving the inboard and outboard friction pads into frictional engagement with the rotor; and at least one pad spring carried by the disc brake assembly and including a first end, a second end, and a third end; wherein the first end is adapted to be positioned adjacent a surface of the anchor bracket so as to react thereagainst, the second end is adapted to be operatively connected to an end of the friction pads, and the third end is adapted to be operatively connected to the anchor bracket.

According to a further embodiment of the present invention, the brake shoe assembly comprises: a backing plate having a pair of opposed ends; a friction pad secured to the backing plate; and a pad spring carried by at least one end of the backing plate for moving the friction pad from engagement with a brake rotor of the disc brake assembly when the brake is released; wherein the pad spring includes a first portion for applying a first retraction force and a second portion for applying a second retraction force which is different from the first retraction force.

According to still a further embodiment of the present invention, the brake shoe assembly comprises: a backing plate having a pair of opposed ends; a friction pad secured to the backing plate; and a pad spring carried by at least one end of the backing plate for moving the friction pad from engagement with a brake rotor of the disc brake assembly when the brake is released; wherein the pad spring permanently yields and applies a corresponding force from a geometrically decreasing spring rate as the friction pad wears.

According to yet a further embodiment of the present invention, the brake shoe assembly comprises: a backing plate having a pair of opposed ends; a friction pad secured to the backing plate; and a pad spring carried by at least one end of the backing plate; wherein the pad spring is carried by the backing plate with a portion of the pad spring spaced apart and at an angle from contact with an adjacent surface of the backing plate in a normal position when the disc brake assembly is not actuated.

According to yet another embodiment of the present invention, the pad spring of this invention can incorporate one or more or all of the following features, which are more fully described below: a symmetrical/asymmetrical shoe retraction feature; a symmetrical/asymmetrical shoe attachment feature; and an impact/anti-rattle feature.

Other advantages of this invention will become apparent to those skilled in the art from the following detailed description of the preferred embodiments, when read in light of the accompanying drawings.

BRIEF DESCRIPTION OF THE DRAWINGS

FIG. 26 is a perspective view of a thirteenth embodiment of a pad retraction spring in accordance with this invention.

FIG. 27 is a perspective view of a fourteenth embodiment of a pad retraction spring in accordance with this invention.

FIGS. 28 and 29 are perspective views of a fifteenth embodiment of a pad retraction spring in accordance with this invention.

FIG. 30 is a perspective view of a sixteenth embodiment of a pad retraction spring in accordance with this invention.

DETAILED DESCRIPTION OF THE PREFERRED EMBODIMENTS

Figure 1:
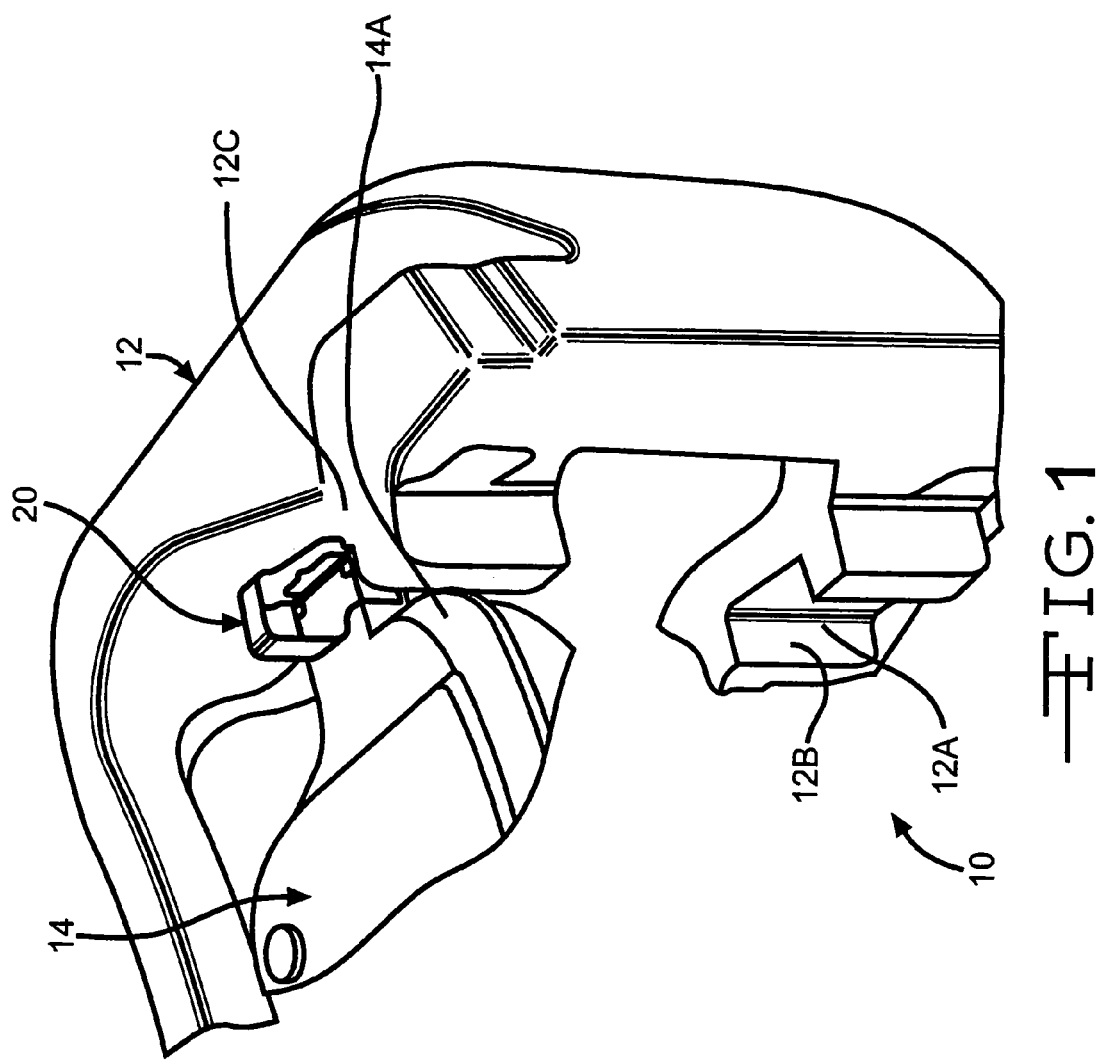
FIG. 1 is a perspective view of a portion of a vehicle disc brake assembly including a first embodiment of a pad retraction spring, adapted for use in the prior art disc brake assembly illustrated in FIGS. 33–35, in accordance with this invention.

Referring now to the drawings, there is illustrated in FIG. 1 a portion of a vehicle disc brake assembly, indicated generally at 10, including a first embodiment of a pad retraction spring or clip, indicated generally at 20, in accordance with the present invention. The general structure and operation of the vehicle disc brake assembly 10 is conventional in the art. Thus, only those portions of the vehicle disc brake assembly 10 which are necessary for a full understanding of this invention will be explained and illustrated. Although this invention will be described and illustrated in conjunction with the particular vehicle disc brake assemblies disclosed herein, it will be appreciated that this invention may be used in conjunction with other vehicle disc brake assemblies.

The disc brake assembly 10 includes an anchor plate, indicated generally at 12, having a pair of brake shoes or pad assemblies 14 (only one of such brake shoes 14 illustrated in FIG. 1), supported thereon for sliding movement between a braking position and an non-braking position in a known manner. The disc brake assembly 10 also includes the pad retraction spring 20 in accordance with the first embodiment of the present invention. A pad retraction spring 20 is preferably disposed on each of the opposed ends or end tabs of the associated brake shoes 14 (only one of such springs 20 illustrated on one of the ends of the brake shoe 14). In this embodiment, each of the springs 20 is identical in structure and operation, although such is not required if so desired. Each of the springs 20 is preferably stamped from a flat strip or blank of a suitable material. Examples of suitable materials can include SAE 1050 or 1070 steel and stainless steel. Alternatively, the spring 20 can be formed from other suitable metal and non-metal materials and/or from other suitable flat and/or non-flat materials. Also, selected surfaces of the spring 20 can be coated, insulated, or otherwise have applied thereto a suitable "damping" material, such as rubber or silicone material, to help in reducing the transmission or generation of noise in the brake assembly.

Figure 2:
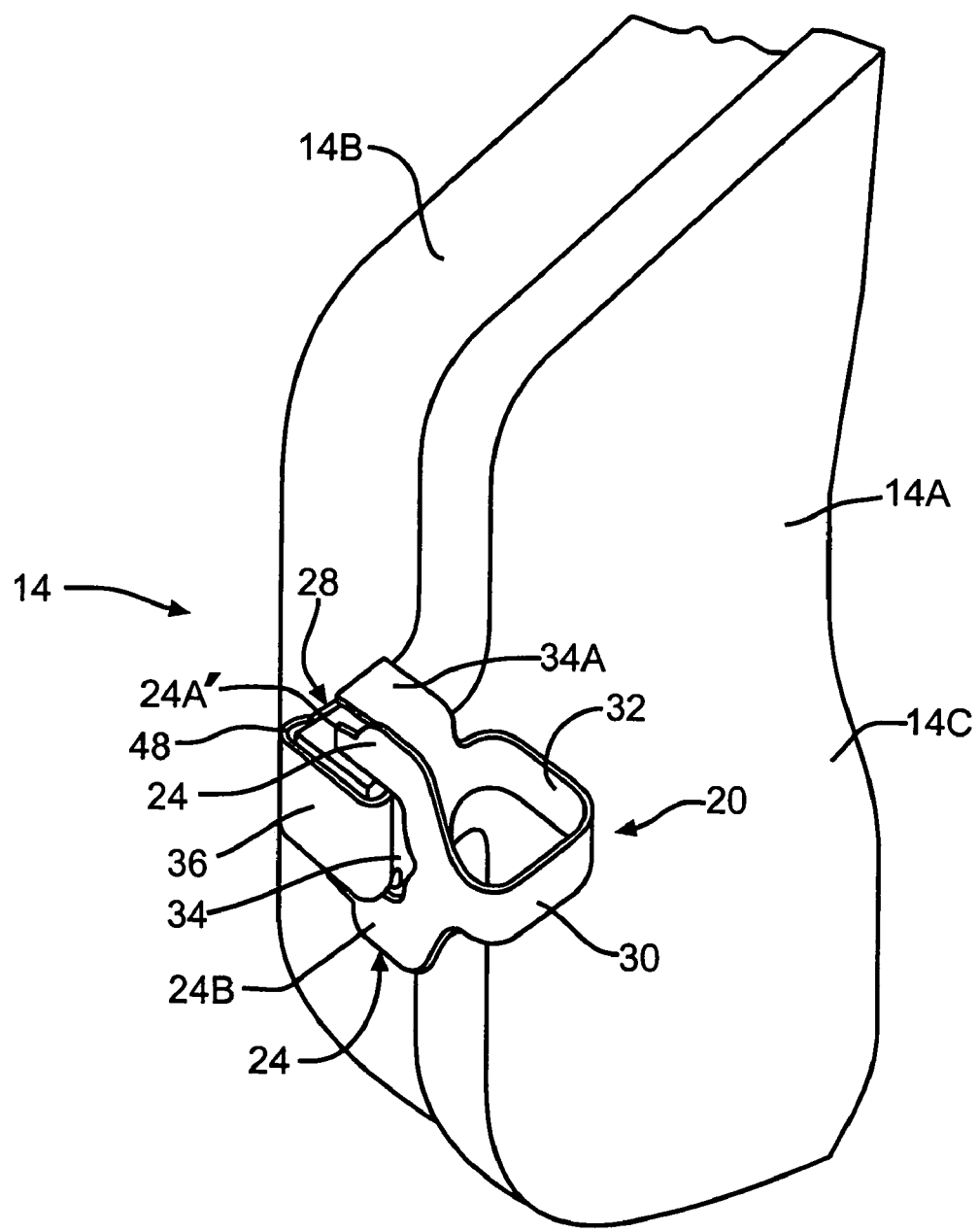
FIG. 2 is a perspective view of the pad retraction spring illustrated in FIG. 1, showing the spring attached to the brake shoe assembly in accordance with this invention.
Figure 3:
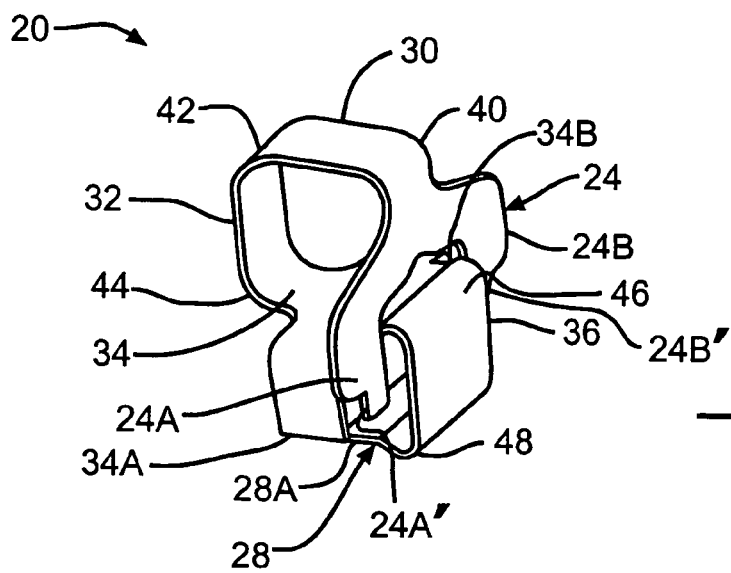
FIG. 3 is a perspective view of the pad retraction spring illustrated in FIGS. 1 and 2 in accordance with this invention.

As best shown in FIG. 3, the pad retraction spring 20 includes a first end 24, which is operatively connected to the anchor bracket 12, and a second end 28, which is operatively connected to an associated backing plate 14A of the brake shoe 14, best shown in FIG. 2. In the illustrated embodiment, the first end 24 of the spring 20 is generally V or U shaped and includes a pair of protruding mounting tabs 24A and 24B extending from a main or center body portion 24C. The tabs 24A and 24B of the first end 24 of the spring 20 are adapted to be received in an outer recess 12A provided in a slot 12B of the anchor bracket 12. In particular, the tabs 24A and 24B are necked down along the remote ends thereof and define respective shoulders 24A' and 24B'. The shoulders 24A' and 24B' engage the side walls of the recess 12A and are operative to seat or position the first end 24 of the spring 20 generally in the center of the slot 12B of the anchor bracket 12. The second end 28 of the spring 20 is generally flat and includes a slightly curled portion 28A. In this embodiment, the tabs 24A and 24B are symmetrical and provide both a symmetrical shoe attachment feature with respect to the anchor bracket, and a symmetrical shoe retraction feature.

The pad retraction spring 20 further includes a plurality of arms. In this embodiment, the spring 20 includes four arms 30, 32, 34, and 36. The arm 30 is connected to the first end 24 by a curved portion 40. The arm 32 is connected to the arm 30 by a curved portion 42 and to the arm 34 by a curved portion 44. The arm 36 is connected to the arm 34 by a curved portion 46 and to the second end 28 by a curved portion 48. In the original formed uninstalled condition, shown in FIG. 3, the arms 32 and 36 and the first end 24 are generally parallel to one another; the arms 30, 34 and the second end 28 are generally parallel to one another and generally perpendicular relative to the arms 32 and 36 and the first end 24; and at least a portion of the first end 24 of the spring 20 (in this embodiment, at least a portion of the remote ends 24A' and 24B' of the tabs 24A and 24B) extends beyond the arm 34 (and therefore an associated rear or back surface 14C of the backing plate 14A to which the spring 20 is attached), in order to provide the spring 20 with a predetermined initial spring retraction force preload when it is installed on a new brake shoe and then subsequently, when the brake shoe is installed in the brake assembly.

In this embodiment, the arm 34 is provided with a pair of arms 34A and 34B (arm 34B only partially shown in FIG. 3), extending from the opposed sides thereof. The arms 34A and 34B are adapted to be disposed over the end or tab of the backing plate 14A and in combination with the second end 28 and the arm 34, cooperate to assist in securing or attaching the spring 20 onto the backing plate 14A of the brake shoe 14. In this embodiment, the arms 34A and 34B are symmetrical and provide a symmetrical shoe attachment feature.

In operation, one or more of the curved portions 40, 42, 44, 46 and 48 of the spring 20 preferably permanently and elastically deforms or yields as the friction pad 14B of the brake shoe 14 wears so that the spring 20 can provide a generally uniform retraction force on the brake shoe 14 regardless of the amount of wear of the friction pad 14B of the brake shoe 14. Alternatively, all of the curved portions 40, 42, 44, 46 and 48 do not have to permanently deform but can elastically deform whereby that the spring 20 provides a generally increasing retraction force on the brake shoe 14 as the friction pad 14B wears. Alternatively, the structure of the pad retraction spring 20 can be other than illustrated if so desired.

Figure 4:
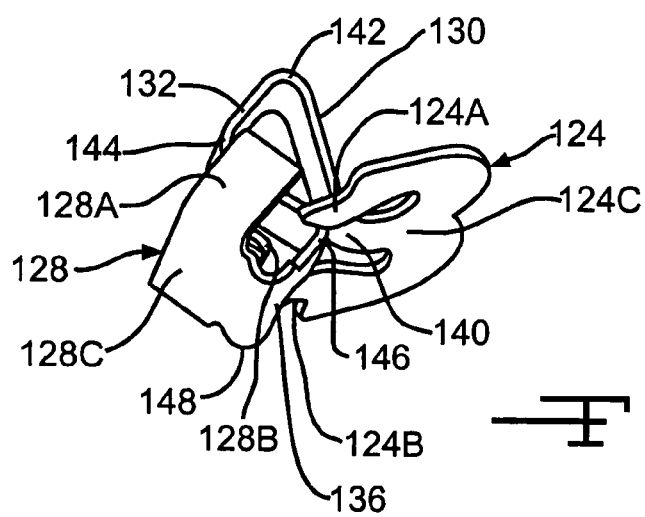
FIGS. 4 and 5 are perspective views of a second embodiment of a pad retraction spring in accordance with this invention.
Figure 5:
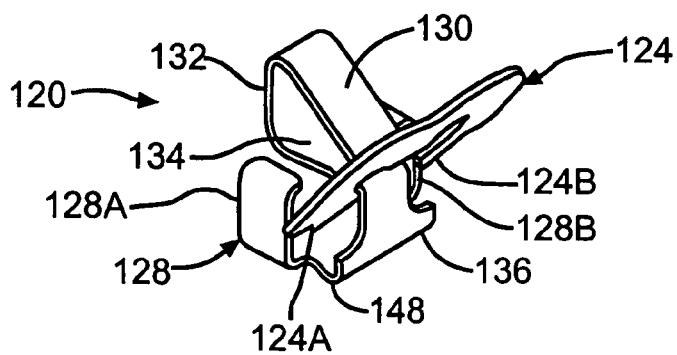

Referring now to FIGS. 4 and 5, there is illustrated a second embodiment of a pad retraction spring, indicated generally at 120, in accordance with the present invention. As shown therein, the pad retraction spring 120 includes a first end 124, which is adapted to be operatively connected to the anchor bracket 12, and a second end 128, which is adapted to be operatively connected to an associated backing plate 14A of the brake shoe 14. In the illustrated embodiment, the first end 124 of the spring 20 is generally M or W shaped and includes a pair of protruding mounting tabs 124A and 124B and a main or center body portion 124C. The tabs 124A and 124B of the first end 124 of the spring 120 are adapted to be received in the outer recess 12A provided in the slot 12B of the anchor bracket 12. In particular, the tabs 124A and 124B are necked down and define respective shoulders 124A' and 124B' along the remote ends thereof. The shoulders 124A' and 124B' are adapted to engage the side walls of the recess 12A and are operative to seat or position the first end 24 of the spring 20 generally in the center of the slot 12B of the anchor bracket 12. In this embodiment, the tabs 124A and 124B are symmetrical and provide both a symmetrical shoe attachment feature with respect to the anchor bracket, and a symmetrical shoe retraction feature.

The second end 128 of the spring 120 is generally U or channel shaped and includes a pair of arms 128A and 128B extending from a main body portion 128C. In the illustrated embodiment, the remote ends of the arms 128A and 128B are slightly curled or rolled over. The arms 128A and 128B of the second end 128 of the spring 120 are adapted to be disposed over the end of the backing plate 14A and in combination with the main body portion 128C and the arm 134, cooperate to assist in securing the spring 120 onto the backing plate 14A of the brake shoe 14. In this embodiment, the arms 128A and 128B are symmetrical and provide a symmetrical shoe attachment feature. The pad retraction spring 120 further includes a plurality of arms. In this embodiment, the spring 120 includes four arms 130, 132, 134 and 136. The arm 130 is connected to the first end 124 by a curved portion 140. The arm 132 is connected to the arm 130 by a curved portion 142 and to the arm 134 by a curved portion 144. The arm 136 is connected to the arm 134 by a curved portion 146 and to the second end 128 by a curved portion 148. In the original formed uninstalled condition as shown in FIGS. 4 and 5, the arms 132 and 136 are generally parallel to one another; the arm 134 and the second end 128 are generally parallel to one another and generally perpendicular relative to the arms 132 and 136; and the arm 130 extends at an angle with respect to the arm 132 and is generally perpendicular with respect to the first end 124.

In operation, one or more of the curved portions 140, 142, 144, 146 and 148 of the spring 120 preferably permanently and elastically deforms as the friction pad 14B of the brake shoe 14 wears so that the spring 120 can provide a generally uniform retraction force on the brake shoe 14 regardless of the amount of wear of the friction pad 14B of the brake shoe 14. Alternatively, all of the curved portions 140, 142, 144, 146 and 148 do not have to permanently deform but can elastically deform whereby that the spring 120 provides a generally increasing retraction force on the brake shoe 14 as the friction pad 14B wears. Alternatively, the structure of the pad retraction spring 120 can be other than illustrated if so desired.

Figure 6:
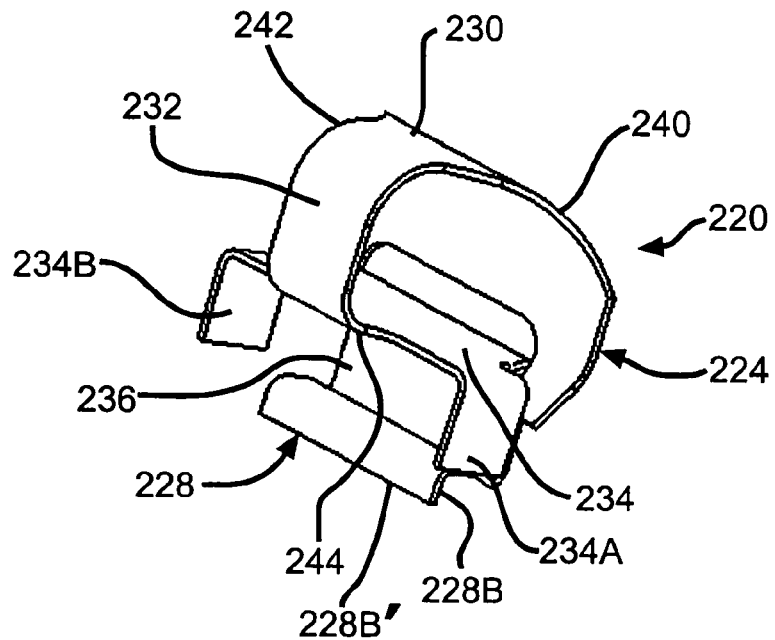
FIGS. 6 and 7 are perspective views of a third embodiment of a pad retraction spring in accordance with this invention.
Figure 7:
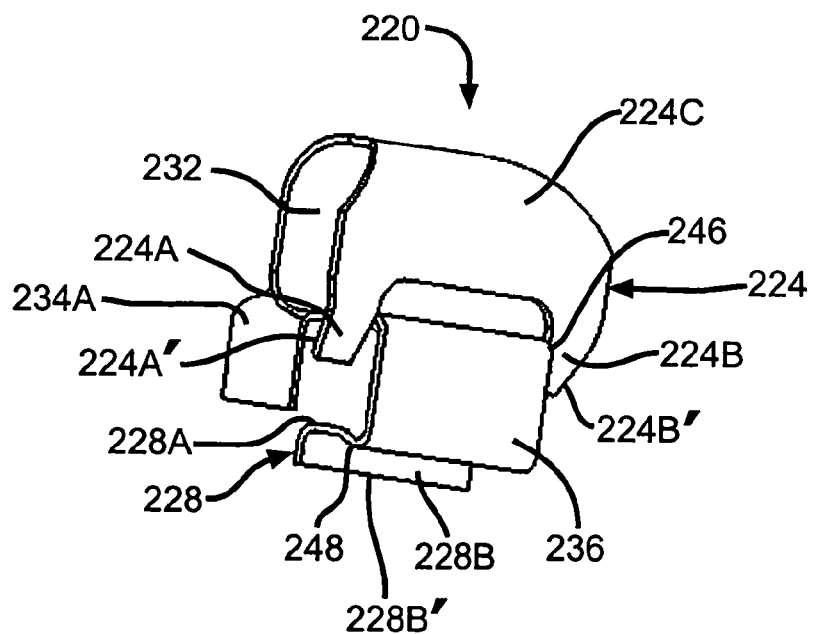

Referring now to FIGS. 6 and 7, there is illustrated a third second embodiment of a pad retraction spring, indicated generally at 220, in accordance with the present invention. As shown therein, the pad retraction spring 220 includes a first end 224, which is adapted to be positioned adjacent a surface 12C of the anchor bracket 12 so as to react thereagainst (the surface 12C shown in FIG. 1), and a second end 228, which is adapted to be operatively connected to an associated backing plate 14A of the brake shoe 14.

In the illustrated embodiment, the first end 224 of the spring 220 is generally U shaped and includes a pair of protruding tabs 224A and 224B extending from a main or center body portion 224C. In particular, the tabs 224A and 224B are angled or bent back relative to the main body portion 224C and are provided with respective tapered outer side wall portions 224A' and 224B'. The second end 228 of the spring 20 includes a generally flat portion 228A and a curled over outermost end portion 228B. In operation, an end surface 228B' of the outermost end portion 228B is adapted to contact a surface of a brake rotor (not shown)

when the pad 14B is sufficiently worn so as to emit an audible signal or noise to indicate that the pad is worn and that the brake shoe should be replaced. In this embodiment, the tabs 224A and 224B are symmetrical and provide a symmetrical shoe retraction feature.

The pad retraction spring 220 further includes a plurality of arms. In this embodiment, the spring 220 includes four arms 230, 232, 234, and 236. The arm 230 is connected to the first end 224 by a curved portion 240. The arm 232 is connected to the arm 230 by a curved portion 242 and to the arm 234 by a curved portion 244. The arm 236 is connected to the arm 234 by a curved portion 246 and to the second end 228 by a curved portion 248. In the original formed uninstalled condition, the arms 232 and 236 and a portion of the main body 224C of the first end 224 are generally parallel to one another; the arms 230, 234 and the portion 228A of the second end 228 are generally parallel to one another and generally perpendicular relative to the arms 232 and 236 and said portion of the first end 224; and at least a portion of the first end 224 of the spring 220 (in this embodiment, at least a portion of the main body 224C), extends beyond the arm 234.

In this embodiment, the arm 234 is provided with a pair of arms 234A and 234B extending from opposed sides thereof. The arms 234A and 234B are adapted to be disposed over the end of the backing plate 14a and in combination with the second end 228 and the arm 234, cooperate to assist in securing the clip 220 onto the backing plate 14A of the brake shoe 14. In this embodiment, the arms 234A and 234B are symmetrical and provide a symmetrical shoe attachment feature.

In operation, one or more of the curved portions 240, 242, 244, 246 and 248 of the spring 220 preferably permanently and elastically deforms as the friction pad 14B of the brake shoe 14 wears so that the spring 220 can provide a generally uniform retraction force on the brake shoe 14 regardless of the amount of wear of the friction pad 14B of the brake shoe 14. Alternatively, all of the curved portions 240, 242, 244, 246 and 248 do not have to permanently deform but can elastically deform whereby that the spring 220 provides a generally increasing retraction force on the brake shoe 14 as the friction pad 14B wears. Alternatively, the structure of the pad retraction spring 220 can be other than illustrated if so desired.

Figure 8:
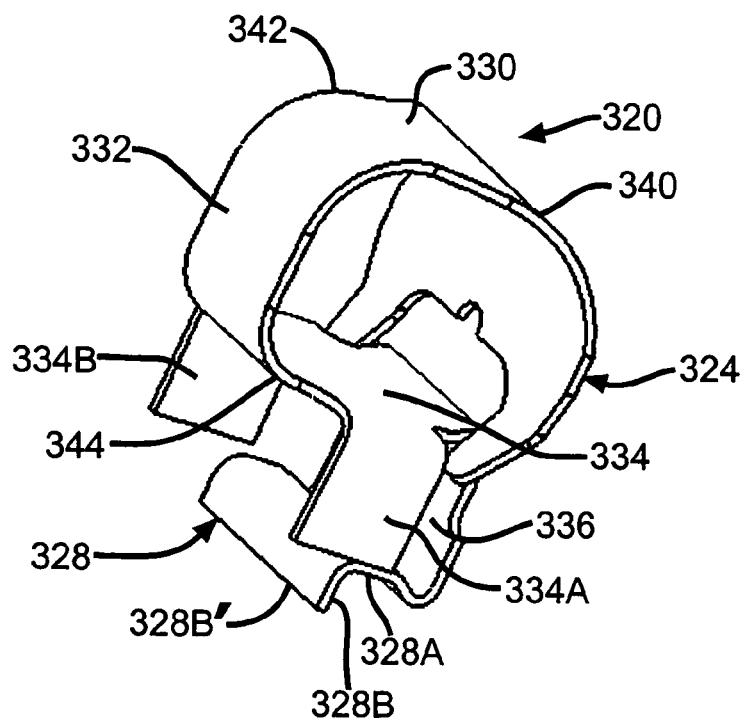
FIGS. 8 and 9 are perspective views of a fourth embodiment of a pad retraction spring in accordance with this invention.
Figure 9:
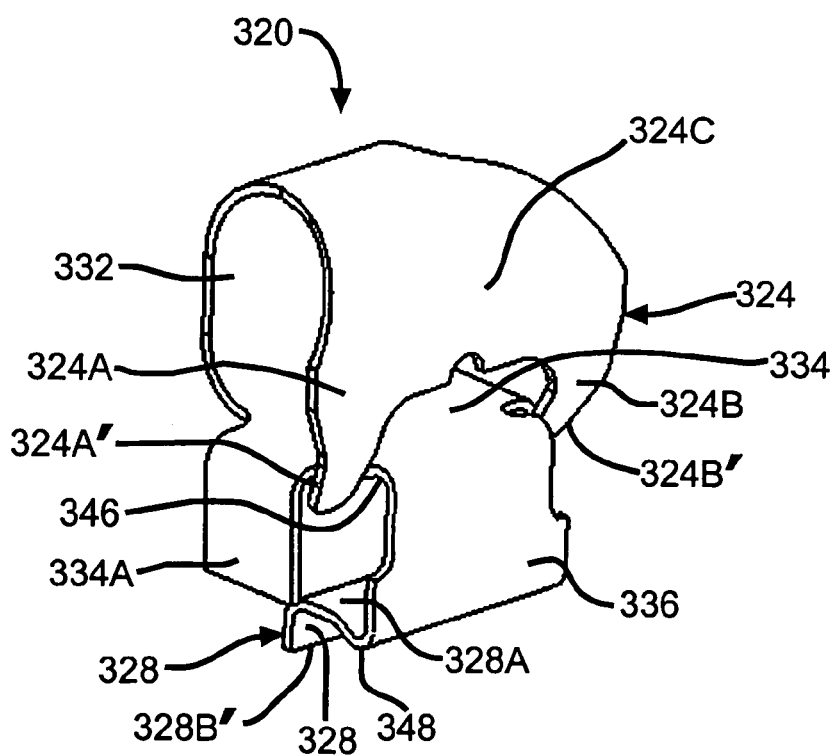

Referring now to FIGS. 8 and 9, there is illustrated a fourth embodiment of a pad retraction spring, indicated generally at 320, in accordance with the present invention. As shown therein, the pad retraction spring 320 includes a first end 324, which is adapted to be positioned adjacent the surface 12C of the anchor bracket 12 so as to react thereagainst, and a second end 328, which is adapted to be operatively connected to an associated backing plate 14A of the brake shoe 14.

In the illustrated embodiment, the first end 324 of the spring 320 is generally U shaped and includes a pair of protruding tabs 324A and 324B extending from a main or center body portion 324C. In particular, the tabs 324A and 324B are angled or bent back relative to the main body portion 324C and are provided with respective tapered outer side wall portions 324A' and 324B'. The second end 328 of the spring 320 includes a generally flat portion 328A and a curled over outermost end portion 328B. In operation, an end surface 328B' of the outermost end portion 328B is adapted to contact a surface of a brake rotor (not shown) when the pad 14B is sufficiently worn so as to emit an audible signal or noise to indicate that the pad is worn and that the brake shoe should be replaced. In this embodiment, the tabs 324A and 324B are symmetrical and provide a symmetrical shoe retraction feature.

The pad retraction spring 320 further includes a plurality of arms. In this embodiment, the spring 320 includes four arms 330, 332, 334, and 336. The arm 330 is connected to the first end 324 by a curved portion 340. The arm 332 is connected to the arm 330 by a curved portion 342 and to the arm 334 by a curved portion 344. The arm 336 is connected to the arm 334 by a curved portion 346 and to the second end 328 by a curved portion 348. In the original formed uninstalled condition as shown in FIGS. 8 and 9, the arms 332 and 336 and a portion of the main body 324C of the first end 324 are generally parallel to one another; the arms 330, 334 and the portion 328A of the second end 328 are generally parallel to one another and generally perpendicular relative to the arms 332 and 336 and said portion of the first end 324; and at least a portion of the first end 324 of the spring 320 (in this embodiment, at least a portion of the main body 324C), extends beyond the arm 334.

In this embodiment, the arm 334 is provided with a pair of arms 334A and 334B extending from opposed sides thereof. The arms 334A and 334B are adapted to be disposed over the end of the backing plate 14A and in combination with the second end 328 and the arm 334, cooperate to assist in securing the clip 320 onto the backing plate 14A of the brake shoe 14. In this embodiment, the arms 334A and 334B are symmetrical and provide a symmetrical shoe attachment feature.

In operation, one or more of the curved portions 340, 342, 344, 346 and 348 of the spring 320 preferably permanently and elastically deforms as the friction pad 14B of the brake shoe 14 wears so that the spring 320 can provide a generally uniform retraction force on the brake shoe 14 regardless of the amount of wear of the friction pad 14B of the brake shoe 14. Alternatively, all of the curved portions 340, 342, 344, 346 and 348 do not have to permanently deform but can elastically deform whereby that the spring 320 provides a generally increasing retraction force on the brake shoe 14 as the friction pad 14B wears. Alternatively, the structure of the pad retraction spring 320 can be other than illustrated if so desired.

Figure 10:
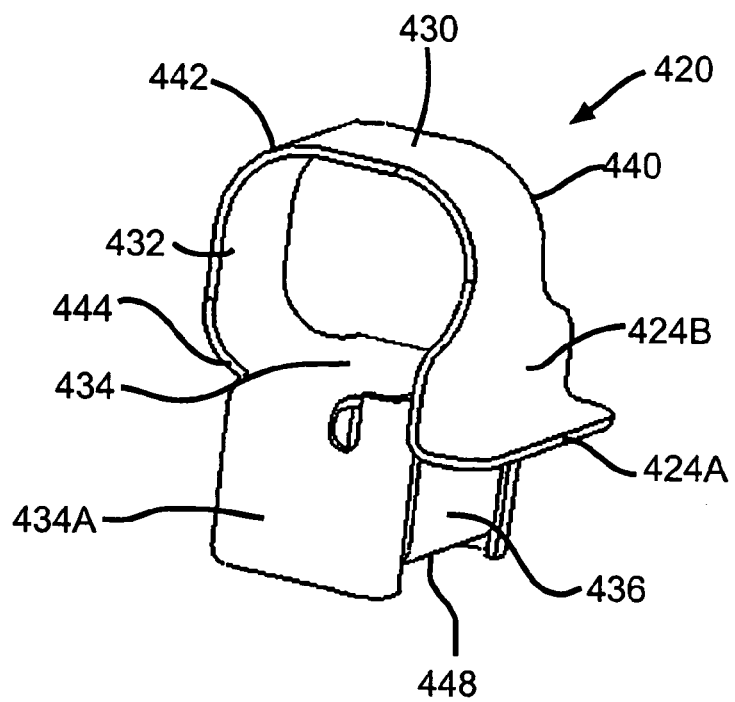
FIGS. 10 and 11 are perspective views of a fifth embodiment of a pad retraction spring in accordance with this invention.
Figure 11:
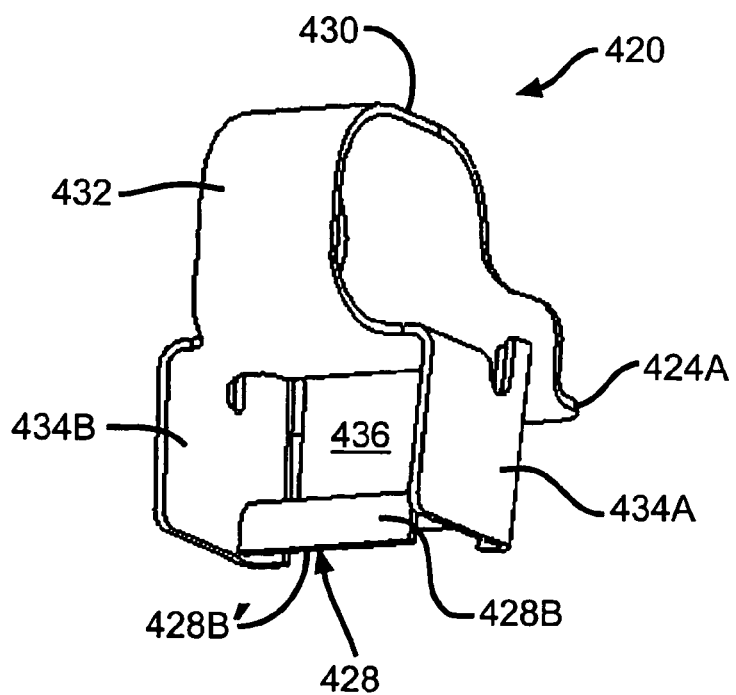

Referring now to FIGS. 10 and 11, there is illustrated a fifth embodiment of a pad retraction spring, indicated generally at 420, in accordance with the present invention. As shown therein, the pad retraction spring 420 includes a first end 424, which is adapted to be positioned adjacent the surface 12C of the anchor bracket 12 so as to react thereagainst, and a second end 428, which is adapted to be operatively connected to an associated backing plate 14A of the brake shoe 14.

In the illustrated embodiment, the first end 424 of the spring 420 includes a protruding tab 424A extending from a main or center body portion 424B. In particular, the tab 424A is angled or bent back relative to the main body portion 424B. The second end 428 of the spring 420 includes a generally flat portion (not shown) and a curled over outermost end portion 428B. In operation, an end surface 428B' of the outermost end portion 428B is adapted to contact a surface of a brake rotor (not shown) when the pad 14B is sufficiently worn so as to emit an audible signal or noise to indicate that the pad is worn and that the brake shoe should be replaced. In this embodiment, the tab 424A is symmetrical and provides a symmetrical shoe retraction feature.

The pad retraction spring 420 further includes a plurality of arms. In this embodiment, the spring 420 includes four arms 430, 432, 434, and 436. The arm 430 is connected to the first end 424 by a curved portion 440. The arm 432 is connected to the arm 430 by a curved portion 442 and to the arm 434 by a curved portion 444. The arm 436 is connected to the arm 434 by a curved portion (not shown) and to the second end 428 by a curved portion 448. In the original formed uninstalled condition as shown in FIGS. 10 and 1, the arms 432 and 436 and a portion of the main body 424B of the first end 424 are generally parallel to one another; the arms 430, 434 and the portion 428A of the second end 428 are generally parallel to one another and generally perpendicular relative to the arm 432 and said portion of the first end 424; and at least a portion of the first end 424 of the spring 420 (in this embodiment, at least a portion of the main body 424B and the tab 424A), extends beyond the arm 434.

In this embodiment, the arm 434 is provided with a pair of arms 434A and 434B extending from opposed sides thereof. The arms 434A and 434B are adapted to be disposed over the end of the backing plate 14A and in combination with the second end 428 and the arm 434, cooperate to assist in securing the spring 420 onto the backing plate 14A of the brake shoe 14. In this embodiment, the arms 434A and 434B are symmetrical and provide a symmetrical shoe attachment feature. In operation, one or more of the curved portions 440, 442, 444, and 448 of the spring 420 preferably permanently and elastically deforms as the friction pad 14B of the brake shoe 14 wears so that the spring 420 can provide a generally uniform retraction force on the brake shoe 14 regardless of the amount of wear of the friction pad 14B of the brake shoe 14. Alternatively, all of the curved portions do not have to permanently deform but can elastically deform whereby that the spring 420 provides a generally increasing retraction force on the brake shoe 14 as the friction pad 14B wears. Alternatively, the structure of the pad retraction spring 420 can be other than illustrated if so desired.

Figure 12:
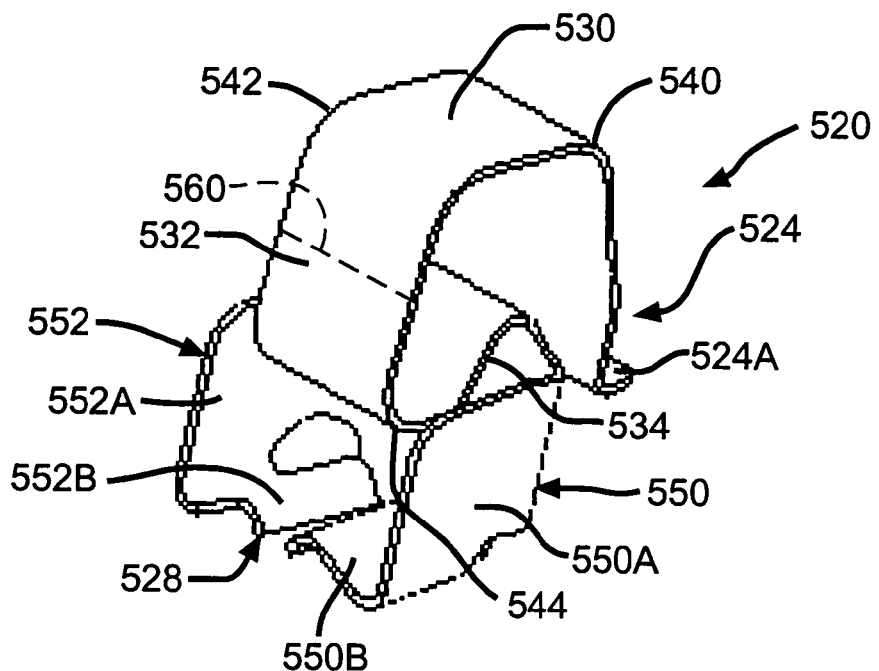
FIGS. 12 and 13 are perspective views of a sixth embodiment of a pad retraction spring in accordance with this invention.
Figure 13:
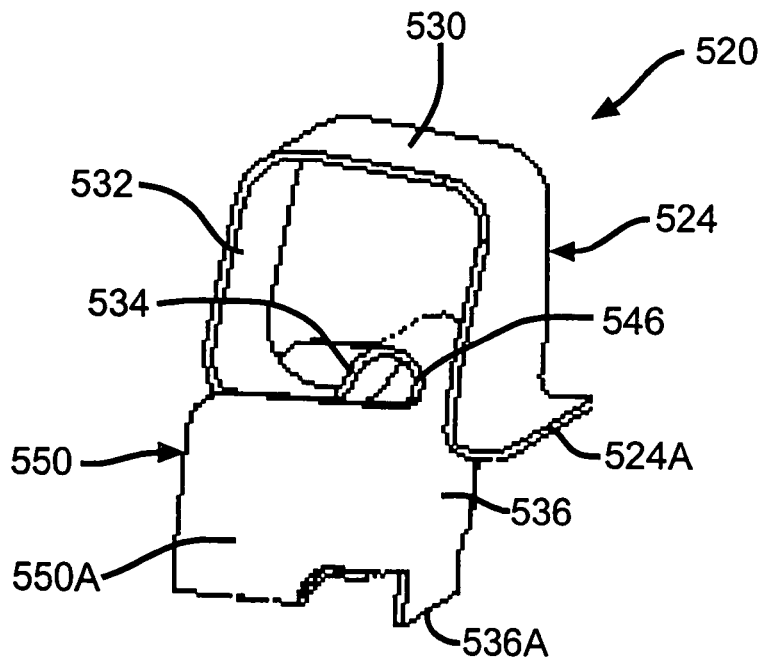

Referring now to FIGS. 12 and 13, there is illustrated a sixth embodiment of a pad retraction spring, indicated generally at 520, in accordance with the present invention. As shown therein, the pad retraction spring 520 includes a first end 524, which is adapted to be positioned adjacent the surface 12C of the anchor bracket 12 so as to react thereagainst, and a second end 528, which is adapted to be operatively connected to an associated backing plate 14A of the brake shoe 14. In the illustrated embodiment, the first end 524 of the spring 520 includes a protruding tab 524A extending from a main or center body portion 524B. In particular, the tab 524A is angled or bent back relative to the main body portion 524B. In this embodiment, the tab 524A is symmetrical and provides a symmetrical shoe retraction feature.

The pad retraction spring 520 further includes a plurality of arms. In this embodiment, the spring 520 includes four arms 530, 532, 534, and 536. The arm 530 is connected to the first end 524 by a curved portion 540. The arm 532 is connected to the arm 530 by a curved portion 542 and to the arm 534 by a curved portion 544. The arm 536 is connected to the arm 534 by a curved portion 546. In the original formed uninstalled condition as shown in FIGS. 12 and 13, the arms 532 and 536 and a portion of the main body 524B of the first end 524 are generally parallel to one another and generally perpendicular to the arm 530 and at least a portion of the first end 524 of the spring 520 (in this embodiment, at least a portion of the main body 524B and the tab 524A), extends beyond the arm 534.

In this embodiment, the arm 536 is provided with a pair of arms 550 and 552 extending from opposed sides thereof. The arm 550 includes a generally flat side wall 550A and a partly wavy or curled remote end 550B. Similarly, the arm 552 includes a generally flat side wall 550B and a partly wavy remote end 552B. The arms 550 and 552 are adapted to be disposed over the end of the backing plate 14A and in combination with the arms 534 and 536, cooperate to assist in securing the spring 520 onto the backing plate 14A of the brake shoe 14. In this embodiment, the arm 536 includes an end surface 536A. In operation, the end surface 536A of the arms 536 is adapted to contact a surface of a brake rotor (not shown) when the pad 14B is sufficiently worn so as to emit an audible signal or noise to indicate that the pad is worn and that the brake shoe should be replaced. In this embodiment, the arms 550 and 552 are symmetrical and provide a symmetrical shoe attachment feature.

Figure 14:
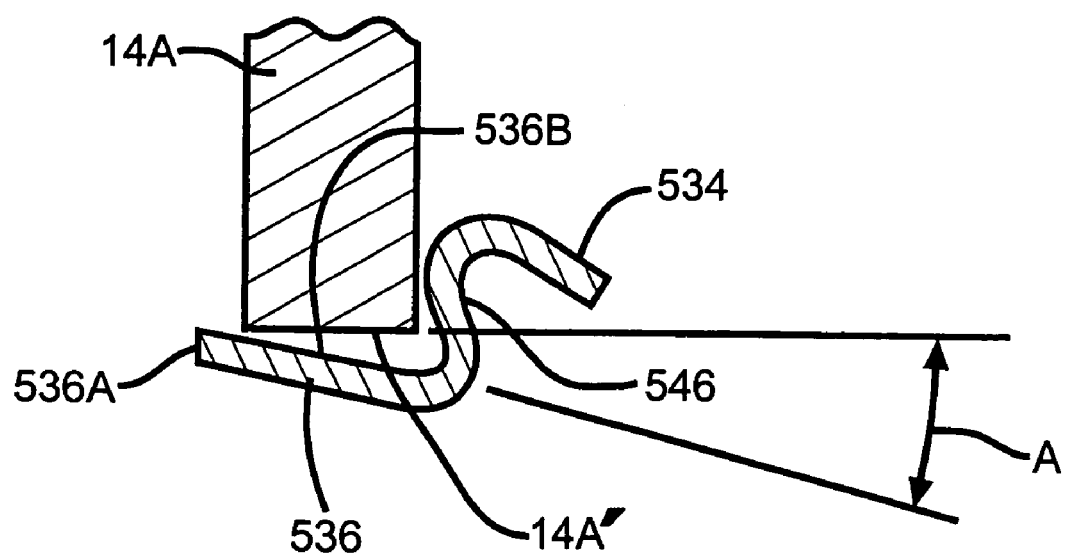
FIG. 14 is a partial view of a portion of a brake shoe including the pad retraction spring illustrated in FIGS. 12 and 13 installed thereon.

Also, as shown in FIG. 14, when the spring 520 is attached to the backing plate 14A, the arm 536 of the spring 520 is positioned at an angle A with respect to an end surface 14A' of the tab of the backing plate 14A. In particular, an inner surface 536B of the arm 536 is positioned at the angle A with respect to the surface 14A' of the tab of the backing plate 14A so as to define a gap therebetween. As a result of this, during movement of the brake shoe 14 during brake applications, the spring 520 is capable of moving or flexing relative to the backing plate 14A and thereby is capable of functioning to absorb or reduce any "impact" or rattle between the shoe 14 and the bracket 12. The angle A is generally in the range from about 1 degree to about 15 degrees. Preferably, the angle A is in the range from about 4 degrees to about 12 degrees. More preferably, the angle A is approximately 8 degrees. Alternatively, the angle A can be other than illustrated and described depending upon the particular vehicle application and associated operating characteristics thereof.

In operation, one or more of the curved portions 540, 542, 544, and 546 of the spring 520 preferably permanently and elastically deforms as the friction pad 14B of the brake shoe 14 wears so that the spring 520 can provide a generally uniform retraction force on the brake shoe 14 regardless of the amount of wear of the friction pad 14B of the brake shoe 14. Alternatively, all of the curved portions 540, 542, 544, 546 and 548 do not have to permanently deform but can elastically deform whereby that the spring 520 provides a generally increasing retraction force on the brake shoe 14 as the friction pad 14B wears. Alternatively, the structure of the pad retraction spring 520 can be other than illustrated if so desired. For example, as shown in FIG. 12, that portion of the spring 520 located "above" dotted line 560 could be eliminated whereby the resulting structure of the spring 520 would not provide any retraction feature but would only provide the "impact" or anti-rattle feature discussed above.

Figure 15:
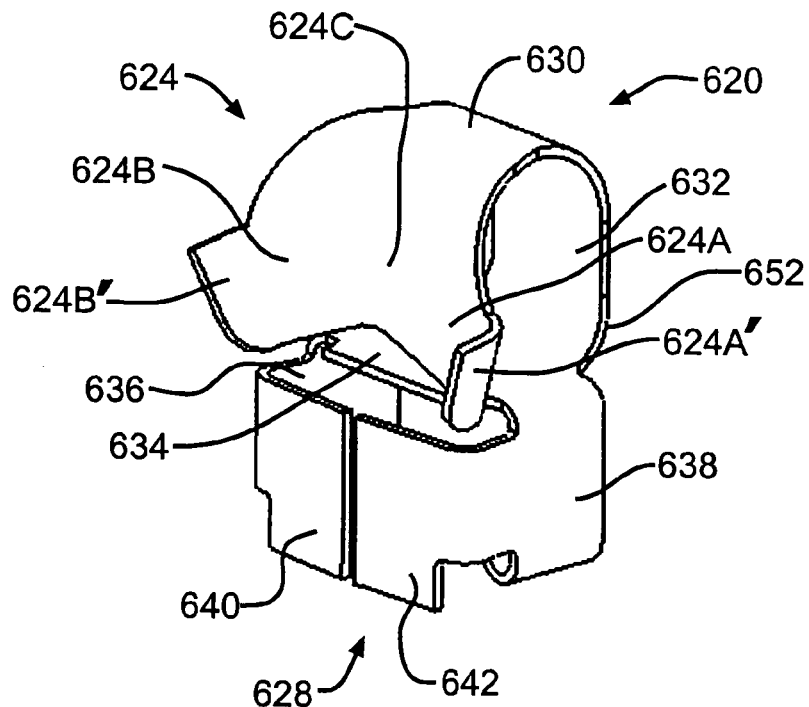
FIGS. 15 and 16 are perspective views of a seventh embodiment of a pad retraction spring in accordance with this invention.
Figure 16:
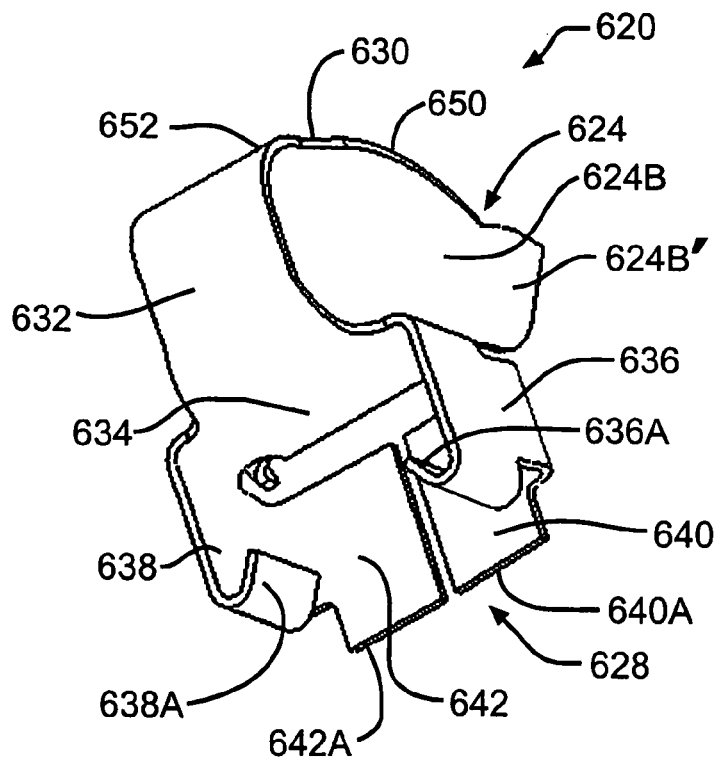

Referring now to FIGS. 15 and 16, there is illustrated a seventh embodiment of a pad retraction spring, indicated generally at 620, in accordance with the present invention. As shown therein, the pad retraction spring 620 includes a first end 624, which is adapted to be positioned adjacent the surface 12C of the anchor bracket 12 so as to react thereagainst, and a second end 628, which is adapted to be operatively connected to an associated backing plate 14A of the brake shoe 14.

In the illustrated embodiment, the first end 624 of the spring 620 includes a pair of protruding tabs 624A and 624B extending from a main or center body portion 624C. In particular, the tabs 624A and 624B have remote ends 624A' and 624B' which are angled or flared outwardly. In this embodiment, the tabs 624A and 624B are symmetrical and provide a symmetrical shoe retraction feature.

The pad retraction spring 620 further includes a plurality of arms. In this embodiment, the spring 620 includes seven arms 630, 632, 634, 636, 638, 640 and 642. In the original formed uninstalled condition as shown in FIGS. 15 and 16, the arms 632, 640 and 642 and a portion of the main body 624C of the first end 624 are generally parallel to one another and generally perpendicular to the arm 634. In this embodiment, the arm 636 is provided with a curled over or inwardly turned remote end 636A. Similarly, the arm 638 is provided with a curled over remote end 638A. The ends 636A and 638A of the respective arms 636 and 638 are adapted to be disposed over the end of the backing plate 14A and in combination with the arms 634, 640 and 642, cooperate to assist in securing the spring 620 onto the backing plate 14A of the brake shoe 14. In this embodiment, the arms 640 and 642 are symmetrical and provide a symmetrical shoe attachment feature.

In this embodiment, when the spring 620 is attached to the backing plate 14A, each of the arms 640 and 642 is adapted to be positioned at an angle with respect to an end surface of the tab of the backing plate so as to provide the impact or anti-rattle feature discussed above in connection with the spring 520. Alternatively, the arms 640 and 642 do not have to be at an angle with respect to the end surface of the backing plate if so desired.

In this embodiment, the arm 640 includes an end surface 640A and the arm 642 includes an end surface 642A. In operation, the end surfaces 640A and 642A of the respective arms 640 and 642 are adapted to contact a surface of a brake rotor (not shown) when the pad 14B is sufficiently worn so as to emit an audible signal or noise to indicate that the pad is worn and that the brake shoe should be replaced.

In operation, the selected portions of the spring 620 preferably permanently and elastically deforms as the friction pad 14B of the brake shoe 14 wears so that the spring 620 can provide a generally uniform retraction force on the brake shoe 14 regardless of the amount of wear of the friction pad 14B of the brake shoe 14. Alternatively, the spring 620 does not have to permanently deform but can elastically deform whereby that the spring 620 provides a generally increasing retraction force on the brake shoe 14 as the friction pad 14B wears. Alternatively, the structure of the pad retraction spring 620 can be other than illustrated if so desired.

Figure 17:
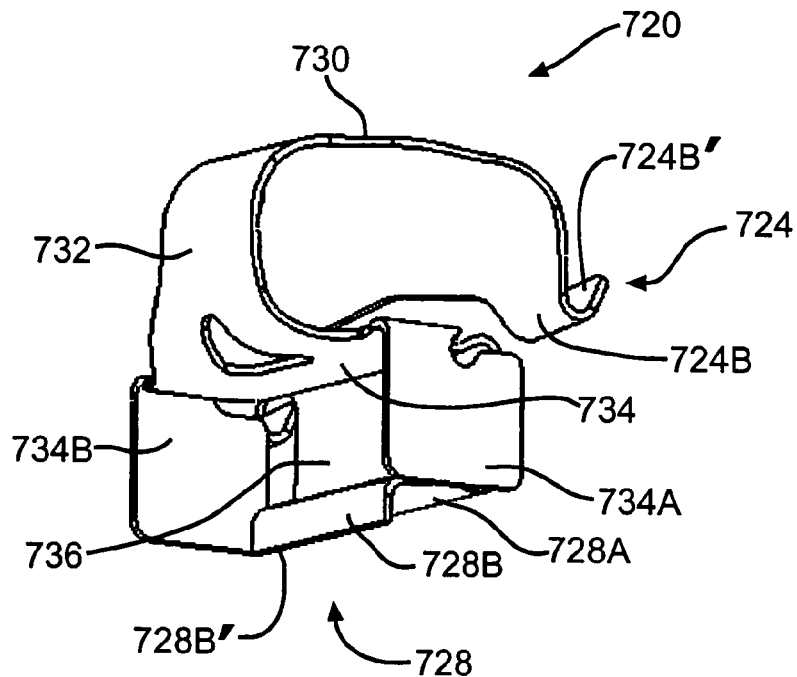
FIGS. 17 and 18 are perspective views of an eighth embodiment of a pad retraction spring in accordance with this invention.
Figure 18:
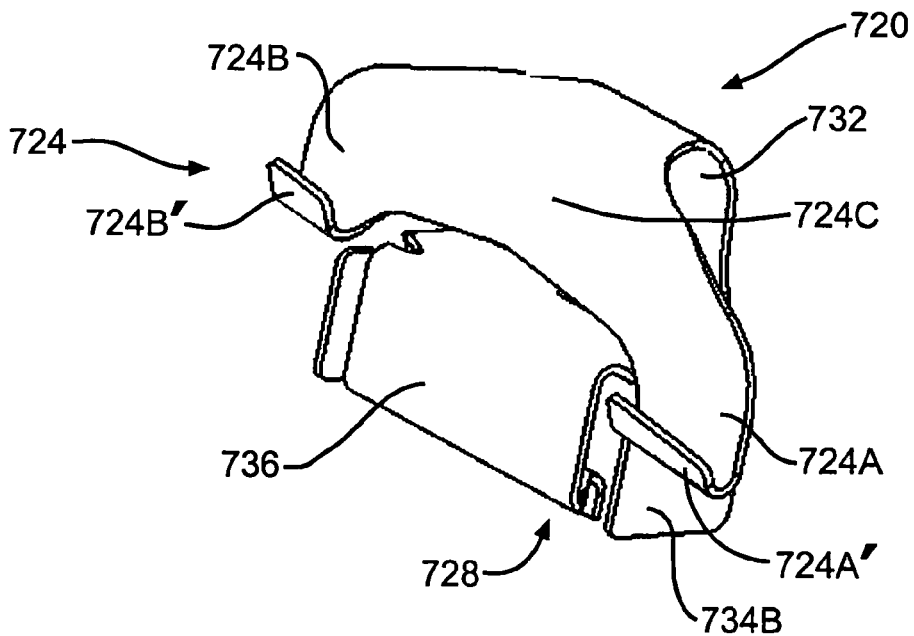

Referring now to FIGS. 17 and 18, there is illustrated an eighth embodiment of a pad retraction spring, indicated generally at 720, in accordance with the present invention. As shown therein, the pad retraction spring 720 includes a first end 724, which is adapted to be positioned adjacent the surface 12C of the anchor bracket 12 so as to react thereagainst, and a second end 728, which is adapted to be operatively connected to an associated backing plate 14A of the brake shoe 14.

In the illustrated embodiment, the first end 724 of the spring 720 includes a pair of protruding tabs 724A and 724B extending from a main or center body portion 724C. In particular, the tabs 724A and 724B have remote ends 724A' and 724B' which are angled or flared upwardly. The second end 728 of the spring 720 includes a generally flat portion (not shown) and a curled over outermost end portion 728B. In operation, an end surface 728B' of the outermost end portion 728B is adapted to contact a surface of a brake rotor (not shown) when the pad 14B is sufficiently worn so as to emit an audible signal or noise to indicate that the pad is worn and that the brake shoe should be replaced. In this embodiment, the tabs 724A and 724B are symmetrical and provides a symmetrical shoe retraction feature.

The pad retraction spring 720 further includes a plurality of arms. In this embodiment, the spring 720 includes four arms 730, 732, 734, and 736. In the original formed uninstalled condition as shown in FIGS. 17 and 18, the arms 732 and 736 and a portion of the main body 724C of the first end 724 are generally parallel to one another; the arms 730, 734 and the portion 728A of the second end 728 are generally parallel to one another and generally perpendicular relative to the arms 732 and 734 and said portion of the first end 724; and at least a portion of the first end 724 of the spring 720 (in this embodiment, at least a portion of the remote ends 724A' and 724B' of the respective tabs 724A and 724B), extend beyond the arm 734.

In this embodiment, the arm 734 is provided with a pair of arms 734A and 734B extending from opposed sides thereof. The arms 734A and 734B are adapted to be disposed over the end of the backing plate 14A and in combination with the second end 728 and the arm 734, cooperate to assist in securing the spring 720 onto the backing plate 14A of the brake shoe 14. In this embodiment, the arms 734A and 734B are symmetrical and provide a symmetrical shoe attachment feature.

In operation, selected portions of the spring 720 preferably permanently and elastically deforms as the friction pad 14B of the brake shoe 14 wears so that the spring 720 can provide a generally uniform retraction force on the brake shoe 14 regardless of the amount of wear of the friction pad 14B of the brake shoe 14. Alternatively, the selected portions of the spring 720 do not have to permanently deform but can elastically deform whereby that the spring 720 provides a generally increasing retraction force on the brake shoe 14 as the friction pad 14B wears. Alternatively, the structure of the pad retraction spring 720 can be other than illustrated if so desired.

Figure 19:
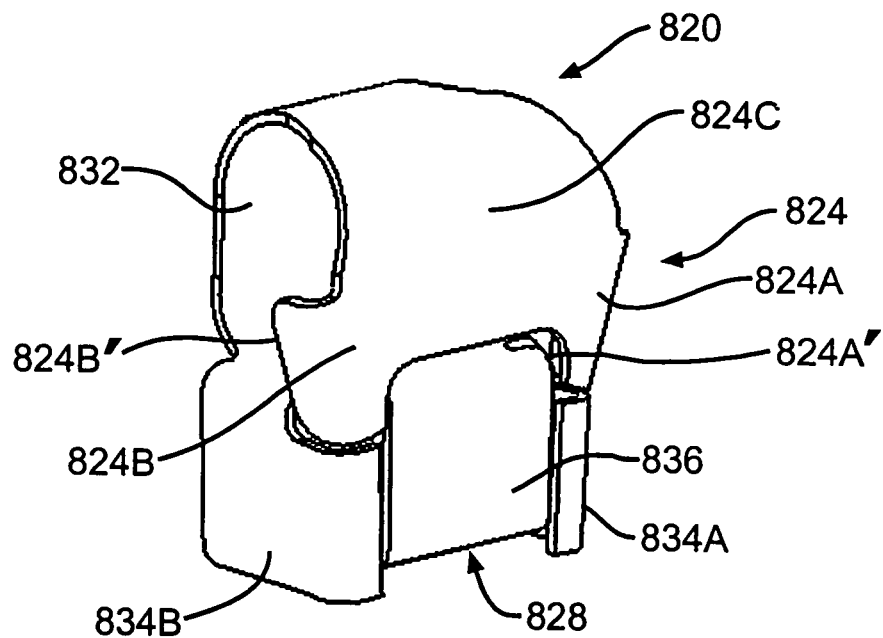
FIGS. 19 and 20 are perspective views of a ninth embodiment of a pad retraction spring in accordance with this invention.
Figure 20:
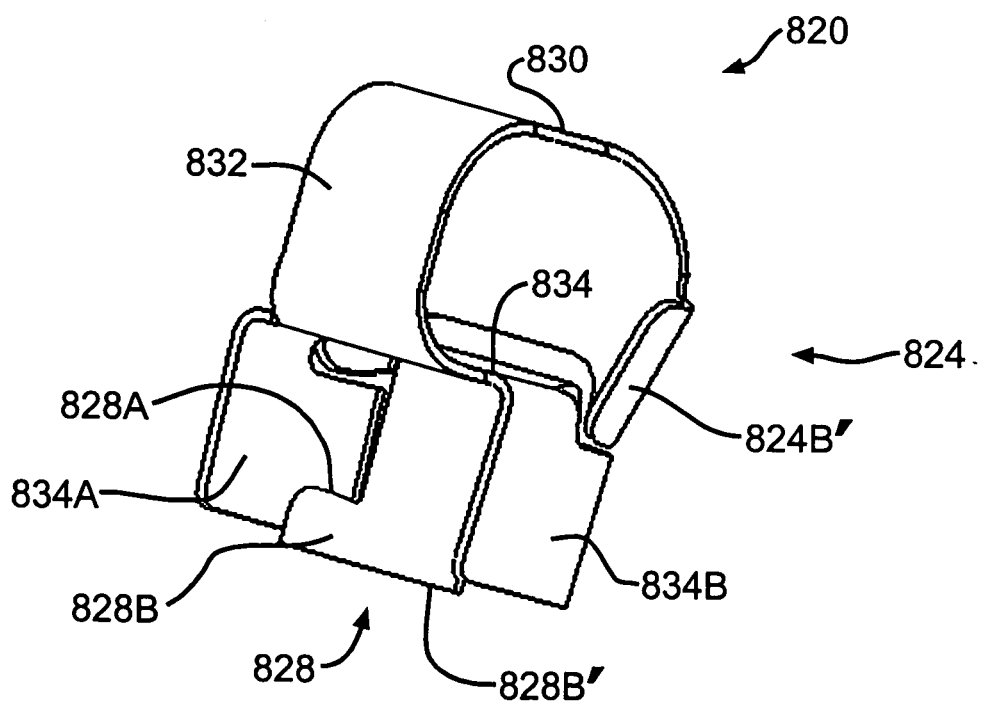

Referring now to FIGS. 19 and 20, there is illustrated a ninth embodiment of a pad retraction spring, indicated generally at 820, in accordance with the present invention. As shown therein, the pad retraction spring 820 includes a first end 824, which is adapted to be positioned adjacent the surface 12C of the anchor bracket 12 so as to react thereagainst, and a second end 828, which is adapted to be operatively connected to an associated backing plate 14A of the brake shoe 14.

In the illustrated embodiment, the first end 824 of the spring 820 includes a pair of protruding tabs 824A and 824B extending from a main or center body portion 824C. In particular, the tabs 824A and 824B have remote ends 824A' and 824B' which are angled or flared inwardly. The second end 428 of the spring 420 includes a generally flat portion 828A and a curled over outermost end portion 428B. In operation, an end surface 428B' of the outermost end portion 428B is adapted to contact a surface of a brake rotor (not shown) when the pad 14B is sufficiently worn so as to emit an audible signal or noise to indicate that the pad is worn and that the brake shoe should be replaced. In this embodiment, the tabs 824A and 824B are symmetrical and provides a symmetrical shoe retraction feature.

The pad retraction spring 820 further includes a plurality of arms. In this embodiment, the spring 820 includes four arms 830, 832, 834, and 836. In the original formed uninstalled condition as shown in FIGS. 19 and 20, the arms 832 and 836 and a portion of the main body 824C of the first end 824 are generally parallel to one another; the arms 830, 834 and the portion 828A of the second end 828 are generally parallel to one another and generally perpendicular relative to the arms 832 and 836 and said portion of the first end 824; and at least a portion of the first end 824 of the spring 820 (in this embodiment, at least a portion of the main body 824C and at least a portion of the remote ends 824A' and 824B' of the respective tabs 824A and 824B), extend beyond the arm 834.

In this embodiment, the arm 834 is provided with a pair of arms 834A and 834B extending from opposed sides thereof. The arms 834A and 834B are adapted to be disposed over the end of the backing plate 14A and in combination with the second end 828 and the arms 834 and 836, cooperate to assist in securing the spring 820 onto the backing plate 14A of the brake shoe 14. In this embodiment, the arms 834A and 834B are symmetrical and provide a symmetrical shoe attachment feature.

In operation, selected portions of the spring 820 preferably permanently and elastically deforms as the friction pad 14B of the brake shoe 14 wears so that the spring 820 can provide a generally uniform retraction force on the brake shoe 14 regardless of the amount of wear of the friction pad 14B of the brake shoe 14. Alternatively, the selected portions of the spring 820 do not have to permanently deform but can elastically deform whereby that the spring 820 provides a generally increasing retraction force on the brake shoe 14 as the friction pad 14B wears. Alternatively, the structure of the pad retraction spring 820 can be other than illustrated if so desired.

Figure 21:
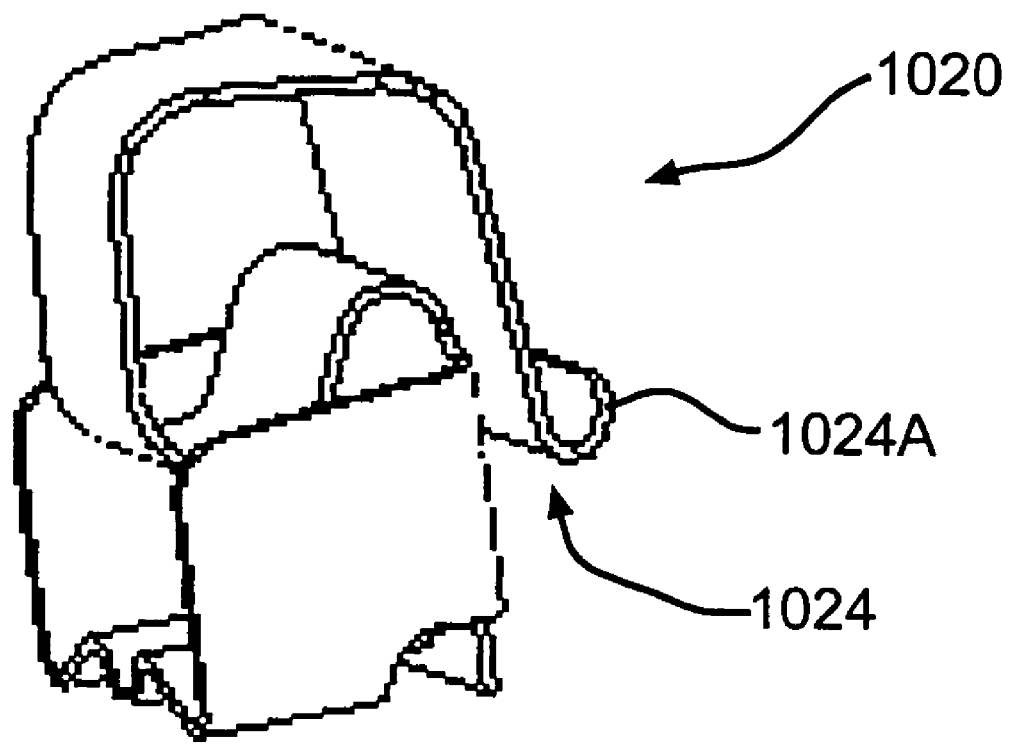
FIG. 21 is a perspective view of a tenth embodiment of a pad retraction spring in accordance with this invention.

Referring now to FIG. 21, there is illustrated an tenth embodiment of a pad retraction spring, indicated generally at 1020, in accordance with the present invention. As shown therein, the pad retraction spring 1020 in this embodiment is generally similar to the pad retraction spring 520 illustrated and describe above in connection with FIGS. 12 and 13 except that in this embodiment, the spring 1020 includes a first end 1024 provided with a generally U-shaped remote end 1024A.

Figure 22:
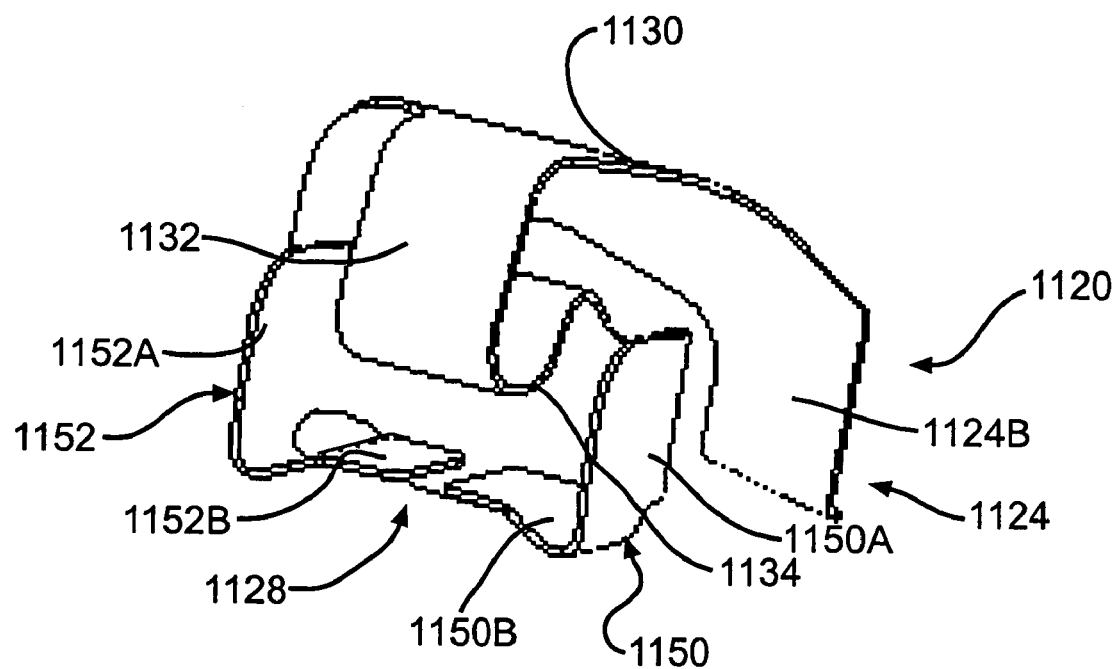
FIGS. 22 and 23 are perspective views of an eleventh embodiment of a pad retraction spring in accordance with this invention.
Figure 23:
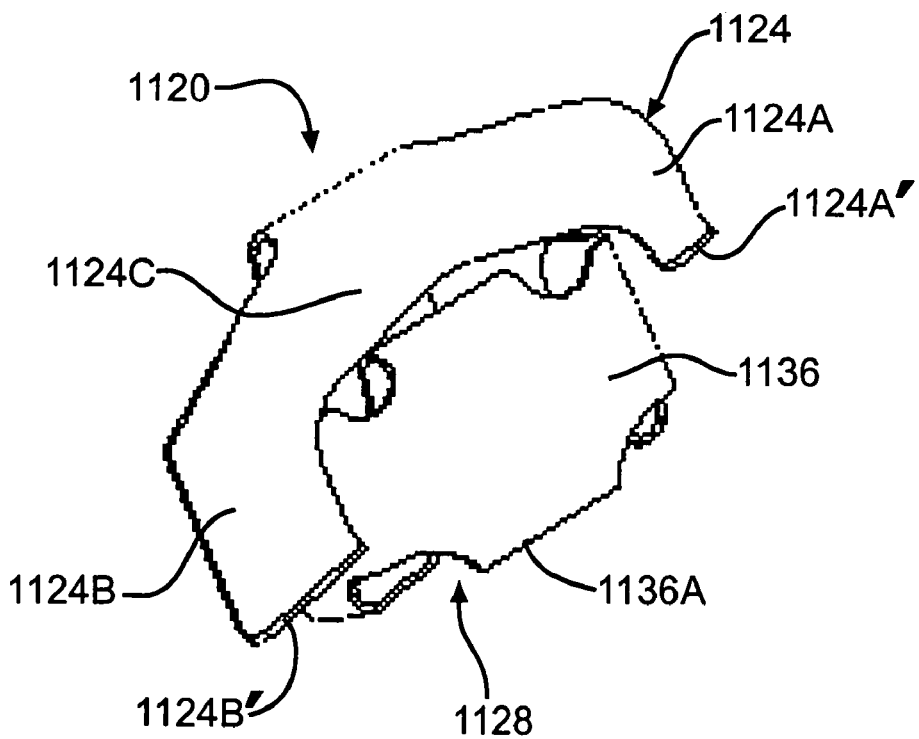

Referring now to FIGS. 22 and 23, there is illustrated an eleventh embodiment of a pad retraction spring, indicated generally at 1120, in accordance with the present invention. As shown therein, the pad retraction spring 1120 includes a first end 1124, which is adapted to be positioned adjacent the surface 12C of the anchor bracket 12 so as to react thereagainst, and a second end 1128, which is adapted to be operatively connected to an associated backing plate 14A of the brake shoe 14.

In the illustrated embodiment, the first end 1124 of the spring 1120 is generally U shaped and includes a pair of protruding tabs 1124A and 1124B extending from a main or center body portion 1124C. In particular, the tabs 1124A and 1124B have remote ends 1124A' and 1124B' which are angled or flared upwardly.

Figure 40:
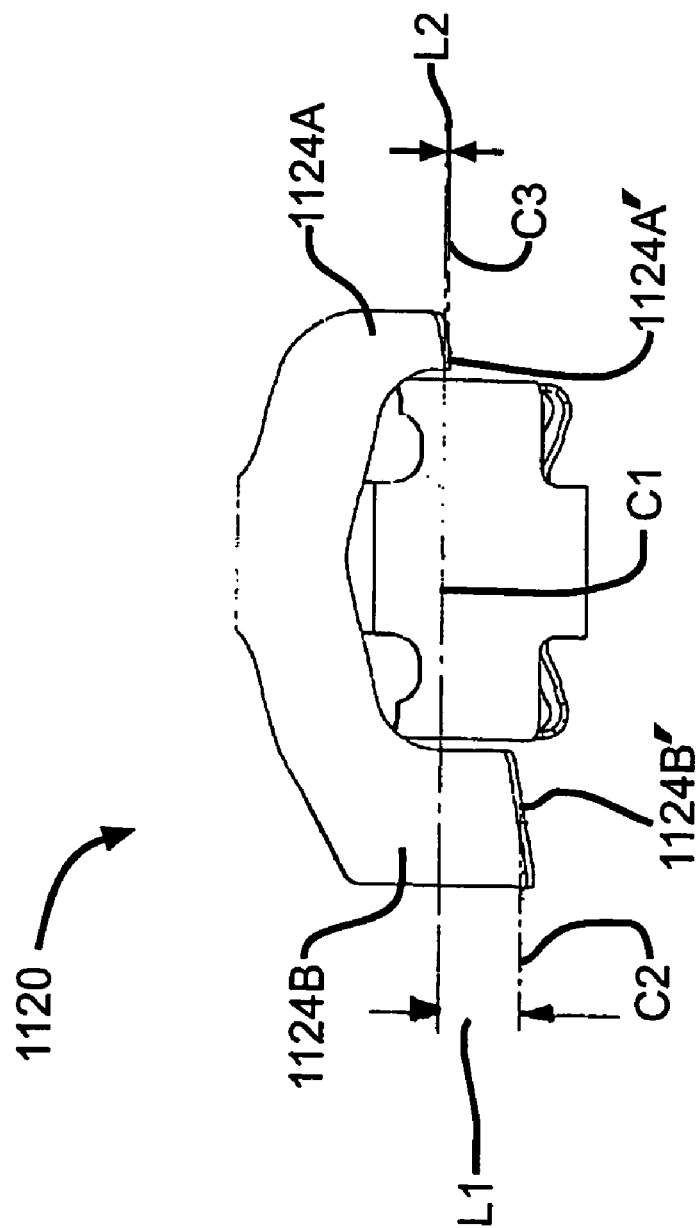
FIG. 40 is another view of the eleventh embodiment of the pad retraction illustrated in FIGS. 22 and 23 in accordance with this invention.

The pad retraction spring 1120 further includes a plurality of arms, in this embodiment, the spring 1120 includes four arms 1130, 1132, 1134, and 1136. The arm 1136 is further provided with a pair of arms 1150 and 1152 extending from opposed sides thereof. The arm 1150 includes a generally flat side wall 1150A and a partly wavy or curled remote end 1150B. Similarly, the arm 1152 includes a generally flat side wall 1150B and a partly wavy remote end 1152B. The arms 1150 and 1152 are adapted to be disposed over the end of the backing plate 14A and in combination with the arms 1134 and 1136, cooperate to assist in securing the spring 1120 onto the backing plate 14A of the brake shoe 14. In this embodiment, the arm 1136 includes an end surface 1136A. In operation, the end surface 1136A of the arm 1136 is adapted to contact a surface of a brake rotor (not shown) when the pad 14B is sufficiently worn so as to emit an audible signal or noise to indicate that the pad is worn and that the brake shoe should be replaced. In this embodiment, the arms 1150 and 1152 are symmetrical and provide a symmetrical shoe attachment feature. Also, in the original formed uninstalled condition as shown in FIGS. 22, 23 and 40, at least a portion of the first end 1124 of the spring 1120 (in this embodiment, at least a portion of both of the remote ends 1124A' and 1124B' of the respective tabs 1124A and 1124B), extends beyond the arm 1134.

In this embodiment, when the spring 1120 is attached to the backing plate 14A, the arm 1136 is adapted to be positioned at an angle with respect to an end surface of the backing plate so as to provide the "impact" or "anti-rattle" feature discussed above in connection with the spring 520. Also, in this embodiment, the tab 1124B and associated end 1124B' are wider as compared to the tab 1124A and associated end 1124A'. As a result of this "asymmetrical" first end or tab design, the "wider" tab 1124B provides a higher amount of retraction force compared to a lower amount of retraction force provided by the "narrower" tab 1124A. This asymmetrical shoe retraction feature can be useful in certain designs or application in order to better balance the associated brake with respect to braking forces generated during application of the brakes.

In operation, selected portions of the spring 1120 preferably permanently and elastically deforms as the friction pad 14B of the brake shoe 14 wears so that the spring 1120 can provide a generally uniform retraction force on the brake shoe 14 regardless of the amount of wear of the friction pad 14B of the brake shoe 14. Alternatively, the selected portions of the spring 1120 do not have to permanently deform but can elastically deform whereby that the spring 1120 provides a generally increasing retraction force on the brake shoe 14 as the friction pad 14B wears. Alternatively, the structure of the pad retraction spring 1120 can be other than illustrated if so desired. For example, the tabs 1124A and 1124B of the spring 1124 can be symmetrical so as to apply generally the same retraction force.

Figure 24:
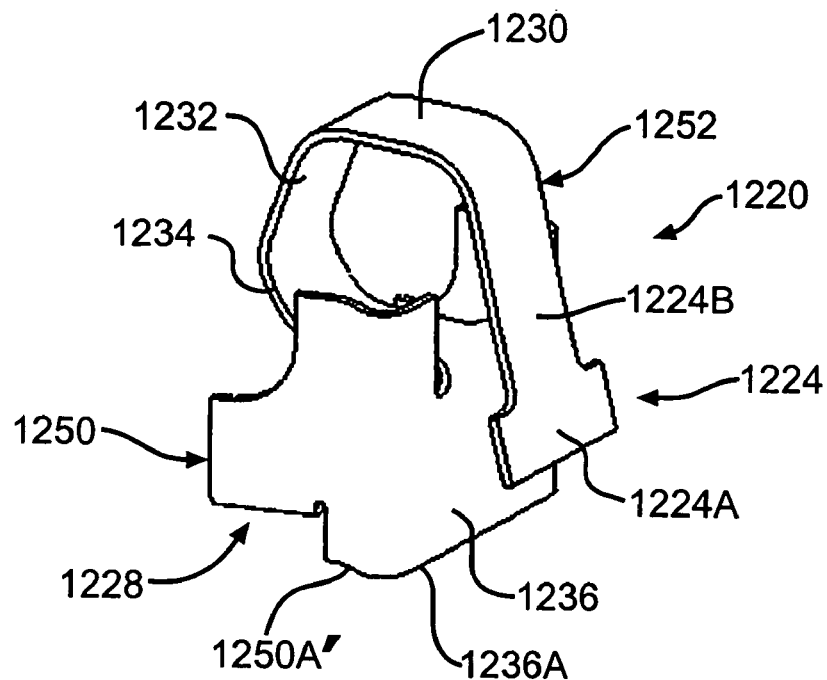
FIGS. 24 and 25 are perspective views of a twelfth embodiment of a pad retraction spring in accordance with this invention.
Figure 25:
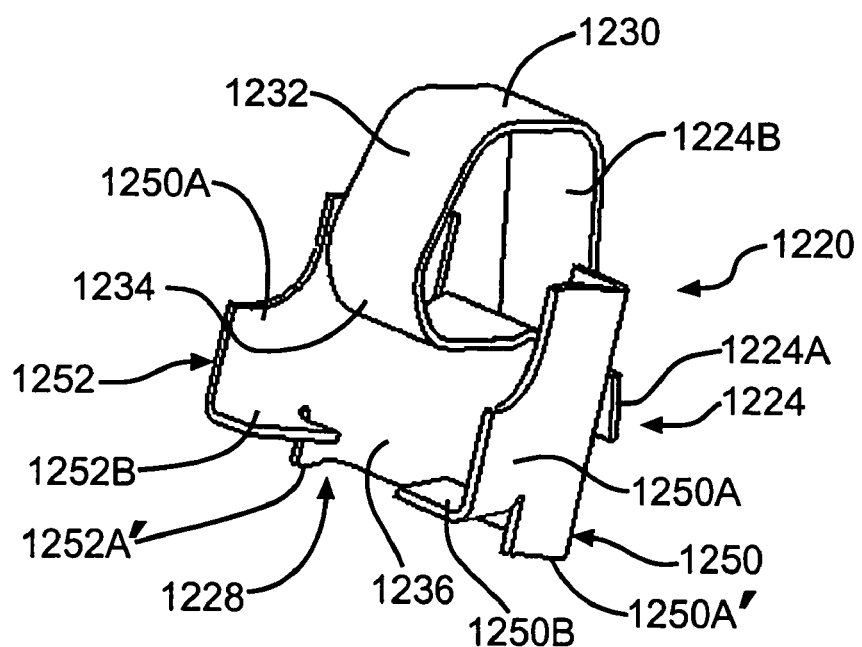

Referring now to FIGS. 24 and 25, there is illustrated a twelfth embodiment of a pad retraction spring, indicated generally at 1220, in accordance with the present invention. As shown therein, the pad retraction spring 1220 includes a first end 1224, which is adapted to positioned adjacent the surface 12C of the anchor bracket 12 so as to react thereagainst, and a second end 1228, which is adapted to be operatively connected to an associated backing plate 14A of the brake shoe 14.

In the illustrated embodiment, the first end 1224 of the spring 1120 includes a protruding tab 1224A provided on the remote end of a main body portion 1224B. In this embodiment, the tab 1224A is symmetrical and provides a symmetrical shoe retraction feature.

The pad retraction spring 1220 further includes a plurality of arms. In this embodiment, the spring 1220 includes four arms 1230, 1232, 1234, and 1236. The arm 1236 is further provided with a pair of arms 1250 and 1252 extending from opposed sides thereof. The arm 1250 includes a generally flat side wall 1250A and a generally flat remote end 1250B. Similarly, the arm 1252 includes a generally flat side wall 1150B and a generally flat remote end 1252B. The arms 1250 and 1252 are adapted to be disposed over the end of the backing plate 14A and in combination with the arms 1234 and 1236, cooperate to assist in securing the spring 1220 onto the backing plate 14A of the brake shoe 14. In this embodiment, the arm 1236 includes an end surface 1236A. In operation, the end surface 1236A of the arm 1236 along with associated end surfaces 1250A' and 1252A' of the arms 1250 and 1252, respectively, are adapted to contact a surface of a brake rotor (not shown) when the pad 14B is sufficiently worn so as to emit an audible signal or noise to indicate that the pad is worn and that the brake shoe should be replaced. In this embodiment, the arms 1250 and 1252 are symmetrical and provide a symmetrical shoe attachment feature.

In operation, selected portions of the spring 1220 preferably permanently and elastically deforms as the friction pad 14B of the brake shoe 14 wears so that the spring 1220 can provide a generally uniform retraction force on the brake shoe 14 regardless of the amount of wear of the friction pad 14B of the brake shoe 14. Alternatively, the selected portions of the spring 1220 do not have to permanently deform but can elastically deform whereby that the spring 1220 provides a generally increasing retraction force on the brake shoe 14 as the friction pad 14B wears. Alternatively, the structure of the pad retraction spring 1220 can be other than illustrated if so desired.

Referring now to FIG. 26, there is illustrated a thirteenth embodiment of a pad retraction spring, indicated generally at 1320, in accordance with the present invention. As shown therein, the pad retraction spring 1320 is generally similar to the pad retraction spring 520 illustrated and describe above in connection with FIGS. 12 and 13 except that in this embodiment, the spring 1320 includes a different profile on remote ends 1350B and 1352B of respective arms 1350 and 1352 thereof.

Referring now to FIG. 27, there is illustrated a fourteenth embodiment of a pad retraction spring, indicated generally at 1420, in accordance with the present invention. As shown therein, the pad retraction spring 1420 includes a first end 1424, which is adapted to be positioned adjacent the surface 12C of the anchor bracket 12 so as to react thereagainst, which is adapted to be operatively connected to an associated backing plate 14A of the brake shoe 14.

In the illustrated embodiment, the first end 1424 of the spring 1420 includes a pair of protruding tabs 1424A and 1424B extending from a main or center body portion 1424C. In particular, the tabs 1424A and 1424B have remote ends 1424A' and 1424B' which are angled or flared upwardly. Also, in this embodiment, the tab 1424A and associated end 1424A' are wider as compared to the tab 1424B and associated end 1424B'. As a result of this "asymmetrical" first end or tab design, the wider tab 1424A provides a higher amount of retraction force compared to a lower amount of retraction force provided by the narrower tab 1424B. This asymmetrical shoe retraction feature allows can be useful in certain designs to balance the associated brake with respect to braking forces generated during application of the brakes.

The second end 1428 of the spring 1420 includes a generally flat portion (not shown) and a curled over outermost end portion 1428B. In operation, an end surface 1428B' of the outermost end portion 1428B is adapted to contact a surface of a brake rotor (not shown) when the pad 14B is sufficiently worn so as to emit an audible signal or noise to indicate that the pad is worn and that the brake shoe should be replaced.

The pad retraction spring 1420 further includes a plurality of arms. In this embodiment, the spring 1420 includes four arms, only three of such arms illustrated in FIG. 27 by reference numbers 1430, 1434, and 1436. In this embodiment, the arm 1434 is provided with a pair of arms 1434A and 1434B extending from opposed sides thereof. The arms 1434A and 1434B are generally flat with a stepped remote end 1434A' and 1434B', respectively. The arms 1434A and 1434B are adapted to be disposed over the end of the backing plate 14A and in combination with the second end 1428 and the arm 1434, cooperate to assist in securing the spring 1420 onto the backing plate 14A of the brake shoe 14.

In this embodiment, the arms 1434A and 1434B are symmetrical and provide a symmetrical shoe attachment feature. Also, in the original formed uninstalled condition as shown in FIG. 27, at least a portion of the first end 1424 of the spring 1420 (in this embodiment, at least a portion of the remote ends 1424A' and 1424B' of the respective tabs 1424A and 1424B), extends beyond the arm 1436.

In operation, selected portions of the spring 1420 preferably permanently and elastically deforms as the friction pad 14B of the brake shoe 14 wears so that the spring 1420 can provide a generally uniform retraction force on the brake shoe 14 regardless of the amount of wear of the friction pad 14B of the brake shoe 14. Alternatively, the selected portions of the spring 1420 do not have to permanently deform but can elastically deform whereby that the spring 1420 provides a generally increasing retraction force on the brake shoe 14 as the friction pad 14B wears. Alternatively, the structure of the pad retraction spring 1420 can be other than illustrated if so desired. For example, the tabs 1424A and 1424B of the spring 1424 can be symmetrical so as to apply generally the same retraction force.

Referring now to FIGS. 28 and 29, there is illustrated a fifteenth embodiment of a pad retraction spring, indicated generally at 1520, in accordance with the present invention. As shown therein, the pad retraction spring 1520 includes a first end 1524, which is adapted to be positioned adjacent the surface 12C of the anchor bracket 12 so as to react thereagainst, and a second end 1528, which is adapted to be operatively connected to an associated backing plate 14A of the brake shoe 14.

In the illustrated embodiment, the first end 1524 of the spring 1520 includes a protruding tab 1524A extending from a main or center body portion 1524B. In particular, the tab 1524A is angled or bent back relative to the main body portion 1524B. In this embodiment, the tab 1524A is symmetrical and provides a symmetrical shoe retraction feature.

The pad retraction spring 1520 further includes a plurality of arms. In this embodiment, the spring 1520 includes six arms 1530, 1532, 1534, 1536, 1538, and 1540. In this embodiment, the arm 1536 is provided with a pair of tabs 1536A and 1536B. The tabs 1536A and 1536B are adapted to contact a surface of a brake rotor (not shown) when the pa 14B is sufficiently worn so as to emit an audible signal or noise to indicate that the pad is worn and that the brake shoe should be replaced.

The arm 1538 includes a first folded back portion 1538A and a second partly folded back portion 1538B. The first portion 1538A includes an outwardly extending outermost end 1538A' and the second portion 1538B includes a curled over outermost end 1538B'. Similarly, the arm 1540 includes a first folded back portion 1540A and a second partly folded back portion 1540B. The first portion 1540A includes an outwardly extending outermost end 1540A' and the second portion 1540B includes a curled over outermost end 1540B'. Also, in this embodiment, the first portion 1540A of the arm 1540 extends a distance C and the second portion 1540B of the arm 1540 extends a distance C' which is less than the distance C. As a result of this "asymmetrical" shoe attachment design, the longer arm portion 1540A provides a lower shoe attachment rate whereas the shorter arm portion 1540B provides a higher shoe attachment rate. This asymmetrical shoe attachment feature can be useful in certain design application in the attachment of the associated brake to the bracket. The arm 1538 has a similar construction to that of the arm 1540.

In operation, selected portions of the spring 1520 preferably permanently and elastically deforms as the friction pad 14B of the brake shoe 14 wears so that the spring 1520 can provide a generally uniform retraction force on the brake shoe 14 regardless of the amount of wear of the friction pad 14B of the brake shoe 14. Alternatively, the spring 1520 does not have to permanently deform but can elastically deform whereby that the spring 1520 provides a generally increasing retraction force on the brake shoe 14 as the friction pad 14B wears. Alternatively, the structure of the pad retraction spring 1520 can be other than illustrated if so desired. For example, the arms 1538 and 1540 of the spring 1524 can have a symmetrical design and/or the spring 1520 can have a first end having an asymmetrical design similar to that described above in connection with spring 1420.

Figure 31:
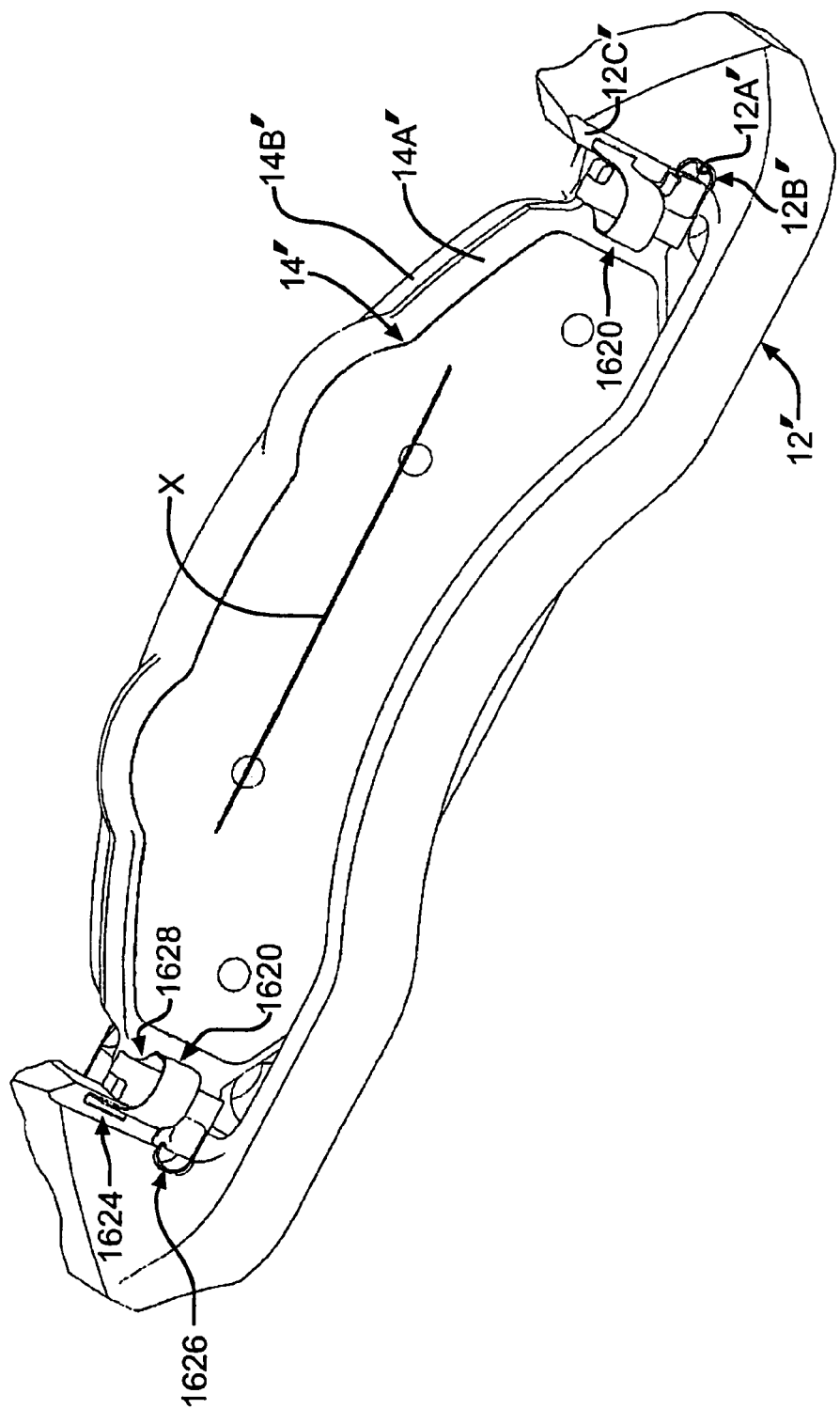
FIG. 31 is a perspective view of a portion of a vehicle disc brake assembly including the pad retraction spring illustrated in FIG. 30 in accordance with this invention.
Figure 32:
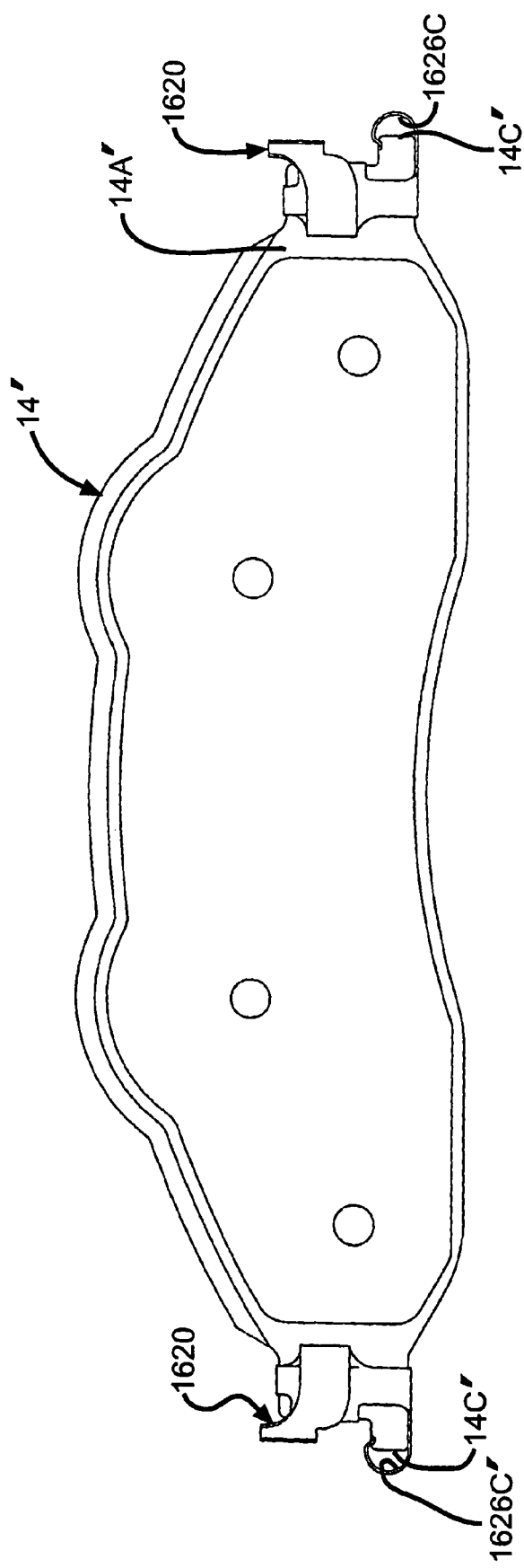
FIG. 32 is a partial view of a portion of a brake assembly illustrated in FIG. 31 in accordance with this invention.

Referring now to FIGS. 30-32, there is illustrated a sixteenth embodiment of a pad retraction spring, indicated generally at 1620, in accordance with the present invention. As shown therein, the pad retraction spring 1620 includes a first end 1624, which is adapted to be positioned adjacent the surface 12C' of the anchor bracket 12 so as to react thereagainst, a second end 1628, which is adapted to be operatively connected to an associated backing plate 14A' of a brake shoe 14', and a third end 1626, which is adapted to be operatively connected to the anchor bracket 12'.

In the illustrated embodiment, the first end 1624 of the spring 1620 includes a protruding tab 1624A extending from a main body portion 1624B. The tab 1624A of the first end 1624 of the spring 1620 is adapted to be disposed adjacent an outer surface 12C' of an anchor bracket 12', as shown in FIG. 31. In particular, the mounting tab 1624A is provided with a curled back remote end 1624A' which is disposed adjacent the surface 12C'.

The second end 1626 of the spring 1620 includes a protruding mounting tab 1626A extending from a main body portion 1626B. The mounting tab 1626A of the second end 1626 of the spring 1620 is adapted to be received in a recess 12A' provided in a slot 12B' provided in the anchor bracket 12', as shown in FIGS. 31 and 32. In particular, the mounting tab 1626A is provided with a curled back remote end 1626A' which is disposed in the recess 12A'. Additionally, when the second end 1626A of the spring 1620 is disposed in the slot 12B', it functions to retain the spring 1620 in the bracket 12' in generally both a vertical and a horizontal direction with respect to a horizontal axis X of the bracket 12'. Also, in this embodiment, when the spring 1620 is attached to the backing plate 14A', an inner surface 1626C of the arm 1626 is positioned away from contact with an associated surface 14C' of the backing plate 14A', as best shown in FIG. 32, so as to define a gap therewith and provide the "impact" or anti-rattle feature discussed above in connection with the spring 520.

The third end 1628 of the spring 1620 includes an angled portion 1628A and a generally flat outermost end portion 1628B. In operation, an end surface 1628B' of the outermost end portion 1628B extends past and associated surface of the brake shoe 14' and is adapted to contact a surface of a brake rotor (not shown) when the pad 14B' is sufficiently worn so as to emit an audible signal or noise to indicate that the pad is worn and that the brake shoe should be replaced.

The pad retraction spring 1620 further includes a plurality of arms. In this embodiment, the spring 1620 includes three arms 1630, 1632 and 1634. In this embodiment, the arm 1632 is adapted to be disposed over the end of the backing plate 14A and in combination with the third end 1628 and the arm 1634, cooperates to assist in securing the spring 1620 onto the backing plate 14A of the brake shoe 14.

In operation, selected portions of the spring 1620 preferably permanently and elastically deforms as the friction pad 14B of the brake shoe 14 wears so that the spring 1620 can provide a generally uniform retraction force on the brake shoe 14 regardless of the amount of wear of the friction pad 14B of the brake shoe 14. Alternatively, all of the selected portions of the spring 1620 do not have to permanently deform but can elastically deform whereby that the spring 1620 provides a generally increasing retraction force on the brake shoe 14 as the friction pad 14B wears. Alternatively, the structure of the pad retraction spring 1620 can be other than illustrated if so desired.

Figure 33:
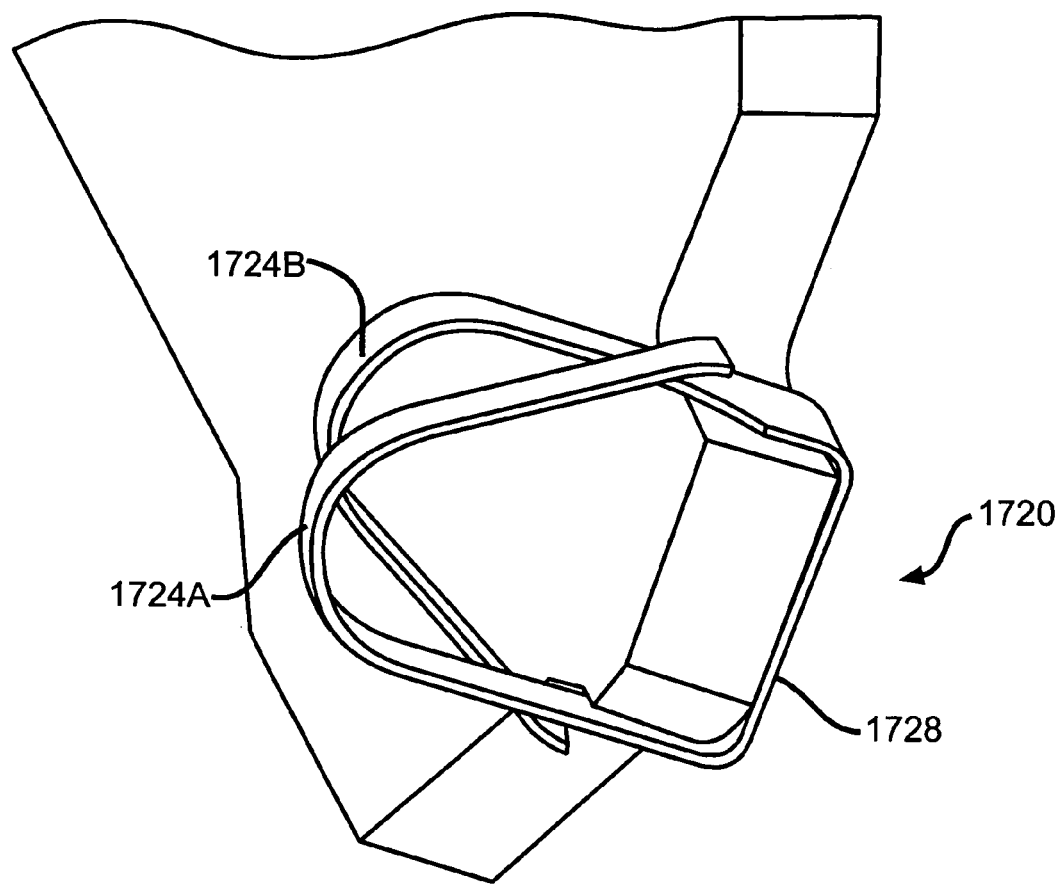
FIG. 33 is a perspective view of an seventeenth embodiment of a pad retraction spring in accordance with this invention.

Referring now to FIG. 33, there is illustrated a seventeenth embodiment of a pad retraction spring, indicated generally at 1720, in accordance with the present invention. As shown therein, the pad retraction spring 1720 includes a first end 1724 having a pair of arms 1724A and 1724B, which are adapted to be positioned adjacent the surface 12C of the anchor bracket 12 so as to react thereagainst, and a second end 1728, which is adapted to be operatively connected to the associated backing plate 14A of the brake shoe 14.

Referring now to prior art FIG. 34, there is illustrated a portion of one kind of prior art vehicle disc brake assembly, indicated generally at 1800, which can include any of the various embodiments of the retraction pad springs of the present invention described hereinabove. The general structure and operation of the prior art disc brake assembly 1800 is conventional in the art. Thus, only those portions of the disc brake assembly 1800 which are necessary for a full understanding of this invention will be explained and illustrated.

The prior art disc brake assembly 1800 is a sliding type of disc brake assembly and includes a generally C-shaped caliper, indicated generally at 1812. The caliper 1812 includes an inboard leg portion 1814 and an outboard leg portion 1816 which are interconnected by an intermediate bridge portion 1818. The caliper 1812 is slidably on a pair of pins (not shown) secured to an anchor bracket (not shown but can be similar to the anchor bracket 12 illustrated in FIG. 1). The anchor bracket is, in turn, secured to a stationary component of the vehicle. Such a stationary component can be, for example, an axle flange (not shown), when the disc brake assembly 1800 is installed for use on the rear of the vehicle, or a steering knuckle (not shown), when the disc brake assembly 1800 is installed for use on the front of the vehicle. The pins support the caliper 1812 for sliding movement relative to the anchor bracket in both the outboard direction (left when viewing prior art FIG. 34) and the inboard direction (right when viewing prior art FIG. 34). Such sliding movement of the caliper 1812 occurs when the disc brake assembly 1800 is actuated, as will be explained below. A pair of bolts (not shown) extend through a pair of apertures (not shown) formed in the anchor bracket to secure the anchor bracket to the stationary vehicle component. Alternatively, other known securing methods can be used to secure the anchor bracket to the stationary vehicle component and/or the caliper 1812 to the anchor bracket.

The anchor bracket includes a pair of guide rails (not shown) which are adapted to slidably support an inboard brake shoe, indicated generally at 1830, and an outboard brake shoe, indicated generally at 1832, respectively. The inboard brake shoe 1830 includes a backing plate 1834 and a friction pad 1836. The outboard brake shoe 1832 includes a backing plate 1838 and a friction pad 1840.

Figure 34:
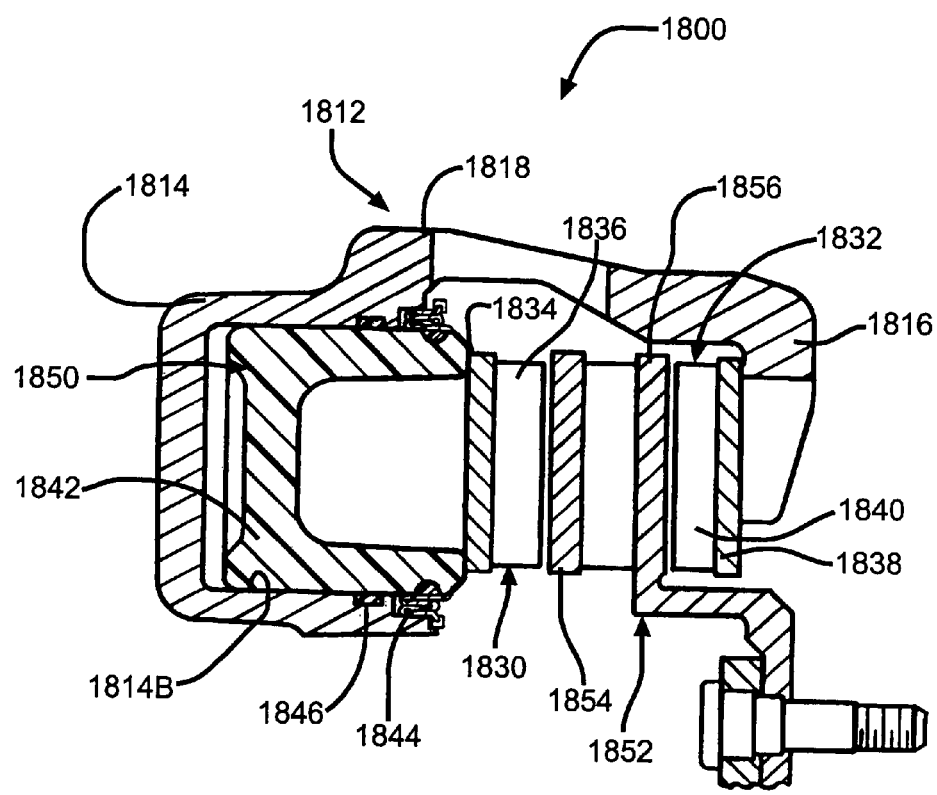
FIG. 34 is a sectional elevational view of a portion of a prior art disc brake assembly.
Figure 38:
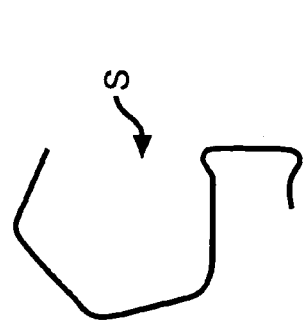
FIGS. 35–38 illustrate various end positions of the pad retraction spring in accordance with this invention.
Figure 37:
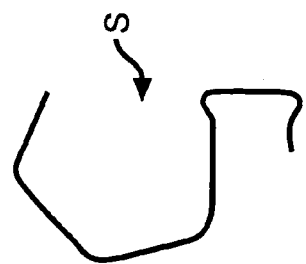
Figure 36:
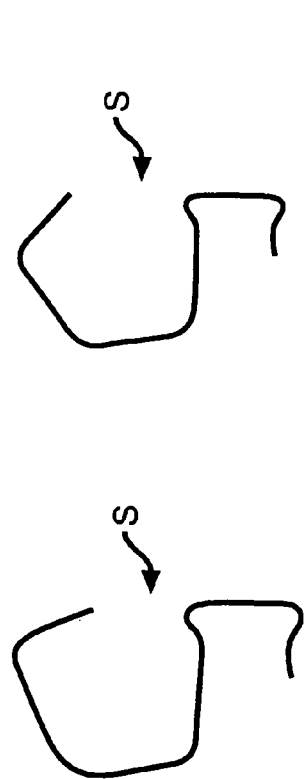
Figure 35:
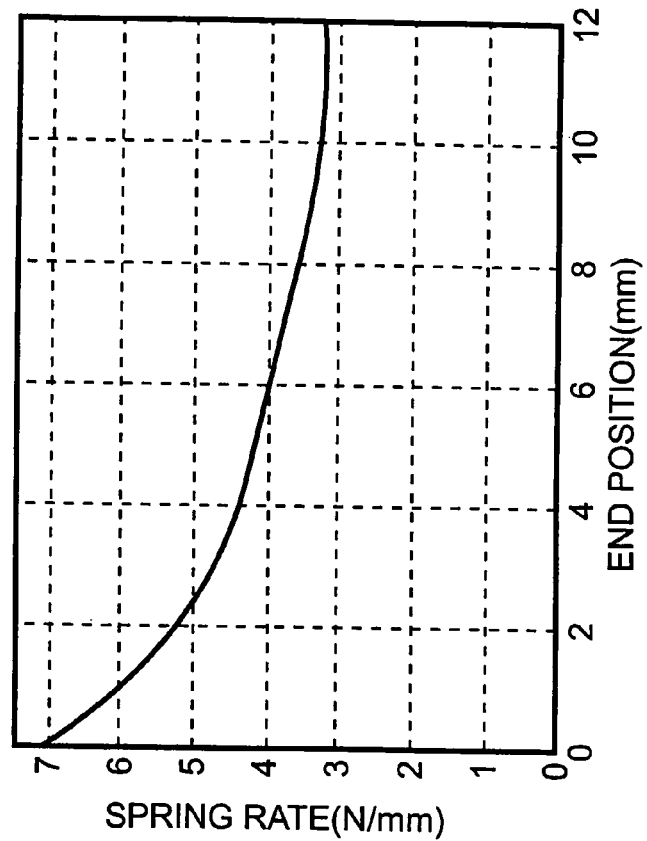

The prior art disc brake assembly 1800 includes an actuation means, indicated generally at 1850 in prior art FIG. 34. The actuation means 1850 is provided for effecting the operation of the disc brake assembly 1800. The actuation means 1850 includes a brake piston 1842 which is disposed in a counterbore or recess 1814B formed in the outboard surface of the inboard leg 1814 of the caliper 1812. The actuation means 1850, shown in this embodiment as being a hydraulic actuation means, is operable to move the piston 1842 within the recess 1814B in the outboard direction (left when viewing prior art FIG. 34). However, other types of actuation means 1850, such as for example, electrical, pneumatic, and mechanical types, can be used.

The prior art disc brake assembly 1800 also includes a dust boot seal 1844 and an annular fluid seal 1846. The dust boot seal 1844 is formed from a flexible material and has a first end which engages an outboard end of the recess 1814B. A second end of the dust boot seal 1844 engages an annular groove formed in an outer side wall of the piston 1842. A plurality of flexible convolutions are provided in the dust boot seal 1844 between the first and second ends thereof. The dust boot seal 1844 is provided to prevent water, dirt, and other contaminants from entering into the recess 1814B. The fluid seal 1846 is disposed in an annular groove formed in a side wall of the recess 1814B and engages the outer side wall of the piston 1842. The fluid seal 1846 is provided to define a sealed hydraulic actuator chamber 1848, within which the piston 1842 is disposed for sliding movement. Also, the fluid seal 1846 is designed to function as a "roll back" seal to retract the piston 1842 within the recess 1814B (right when viewing prior art FIG. 34) when the brake pedal is released.

The prior art disc brake assembly 1800 further includes a brake rotor 1852, which is connected to a wheel (not shown) of the vehicle for rotation therewith via a hub (not shown). The illustrated brake rotor 1852 includes a pair of opposed friction discs 1854 and 1856. The brake rotor 1852 extends radially outwardly between the inboard friction pad 1836 and the outboard friction pad 1840. The construction of the prior art disc brake assembly 1800 is conventional in the art.

Figure 39:
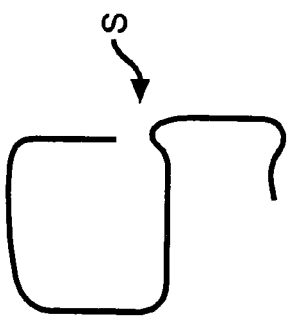
FIG. 39 is a graph showing the spring rate for the positions shown in FIGS. 35–38 of the pad retraction spring in accordance with this invention.

One advantage of the present invention is that if desired, as the pad retraction spring deforms or yields, the geometry of the spring can be selected such that is produces a generally lower spring rate of retraction. This is illustrated in connection with FIGS. 35–39. As shown in FIGS. 35–38, the "end position" of a pad retraction spring S in accordance with this invention is illustrated approximately at 0 mm, 4 mm, 8 mm, and 12 mm. As used herein, the term end position relates to the distance that the brake shoe has moved due to wear of the friction material and FIGS. 35–38 show the structure of the "yielding" spring S at such end position. Also, FIG. 39 is a graph showing the spring rate of the spring S of this invention at selected end positions. Thus, as shown in FIG. 39, due to the geometry of the spring S, the corresponding spring rate of the spring S can be selected so as to produce a decreasing spring rate as the end position of the spring S increases (i.e., as the friction material wears). As a result of this, the geometry of the spring S of the present invention can be selected and used to reduce the load that the spring S applies to the associated brake piston as the friction material of the brake shoe wears. Also, the spring can have angular contacts which are operative to center the spring in the anchor plate slot and which can also provide an anti-rattle feature. In addition, the spring can be configured to incorporate one or more or all of the various features disclosed herein; such as the symmetrical/asymmetrical shoe retraction feature, the symmetrical/asymmetrical shoe attachment feature, and the impact or anti-rattle feature.

Figure 41:
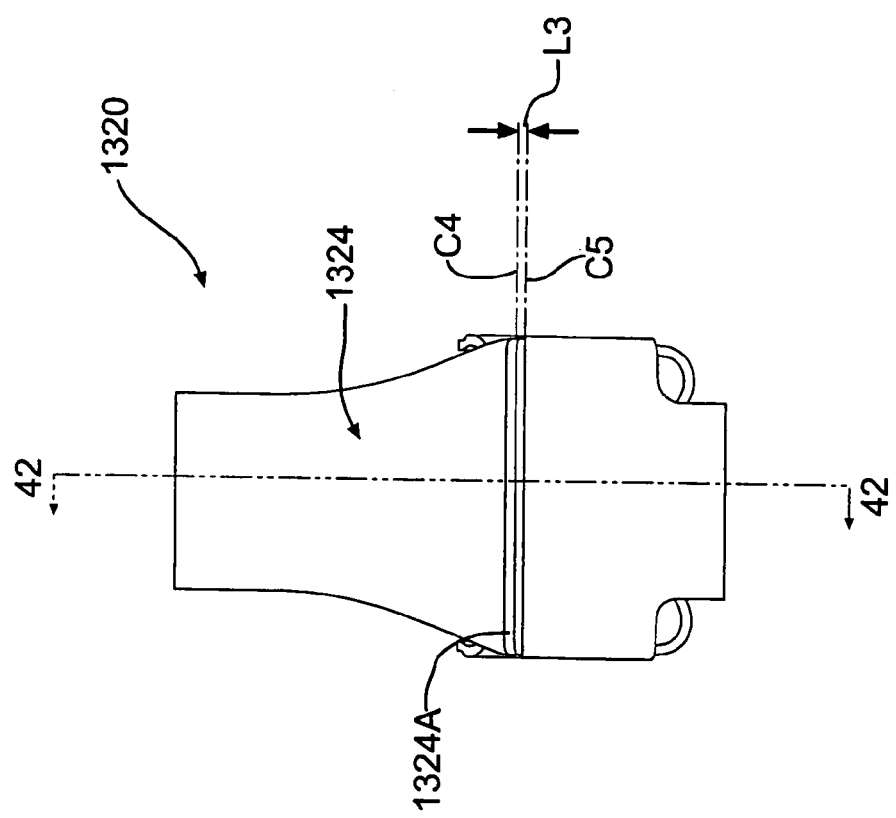
FIGS. 41 and 42 are further views of the thirteenth embodiment of the pad retraction spring illustrated in FIG. 26 in accordance with this invention.
Figure 42:
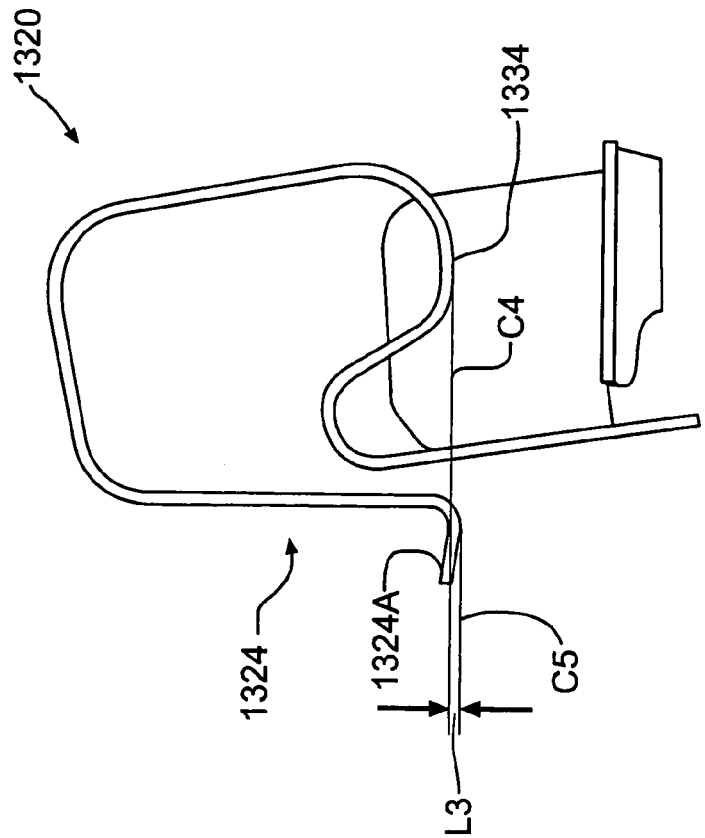

Also, the retraction force provided by the springs of the present invention can be adjusted to apply preselected initial installed retraction loads if so desired. For example, as shown in FIG. 40, in connection with the asymmetrical spring 1120, the tabs 1124A and 1124B can be independently adjusted to apply preselected initial installed retraction loads. In particular, with respect to the tab 1124B, a length L1 defined between an anchor contact midpoint C2 of the remote end 1124B' with the surface 12C of the anchor bracket 12 and a shoe contact point C1 of the arm 1134 with the associated rear surface 14C of the backing plate 14A of the brake shoe can be adjusted as desired to apply a preselected initial installed retraction load. Similarly, with respect to the tab 1124A, a length L2 defined between an anchor contact midpoint C3 of the remote end 1124A' with the surface 12C of the anchor bracket 12 and the shoe contact point C1 of the arm 1134 with the surface 14C of the backing plate 14A of the brake shoe can be adjusted as desired to apply a preselected initial installed retraction load. Thus, the lengths L1 and L2 of the respective tabs 1124B and 1124A can be independently adjusted to apply preselected initial installed retraction loads. Also, as shown in FIGS. 41 and 42, in connection with the symmetrical spring 1320, a tab 1324 can be adjusted to apply a preselected initial installed retraction load. In particular, a length L3 defined between an anchor contact point C5 of an end 1324A with the surface 12C of the anchor bracket 12 and a shoe contact point C4 of an arm 1334 with the surface 14C of the backing plate 14A of the brake shoe can be adjusted as desired to apply a preselected initial installed retraction load. Thus, the length L3 of the tab 11324 can be adjusted to apply preselected initial installed retraction loads.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A disc brake assembly comprising:
   an anchor bracket adapted to be secured to a vehicle component;
   a brake caliper adapted to be secured to said anchor bracket;
   an inboard friction pad and an outboard friction pad carried by said disc brake assembly and adapted to be disposed on opposite axial sides of an associated brake rotor;
   actuation means for selectively moving said inboard and outboard friction pads into frictional engagement with the rotor; and
   a pad spring carried by at least one end of one of said friction pads for moving said friction pads from engagement with the rotor when said actuation means is released;
   wherein said pad spring includes a generally U shaped portion having a first tab and a second tab, said first tab having a first remote end defining a first remote end width for applying a first retraction force and said second tab having a second remote end defining a second remote end width which is different from said first remote end width for applying a second retraction force which is different from said first retraction force thereby providing an asymmetrical friction pad retraction feature.

2. The disc brake assembly according to claim 1, wherein said pad spring is formed from a flat strip of metal material.

3. The disc brake assembly according to claim 1, wherein said pad spring permanently yields as the lining of the friction pad wears.

4. The disc brake assembly according to claim 1, wherein said pad spring permanently yields and applies a corresponding decreasing rate of retraction force as the lining of the friction pad wears.

5. The disc brake assembly according to claim 1, wherein said pad spring is carried by said friction pad in a symmetrical manner.

6. The disc brake assembly according to claim 1, wherein said pad spring is carried by said friction pad with a portion of said spring spaced apart at an angle from contact an adjacent surface of said friction pad in a normal position when the brake is not actuated.

7. A brake shoe assembly adapted for use in a disc brake assembly comprising:
    a backing plate having a pair of opposed ends;
    a friction pad secured to said backing plate; and
    a pad spring carried by at least one end of said backing plate for moving said friction pad from engagement with a brake rotor of the disc brake assembly when the brake is released;
    wherein said pad spring includes a generally U shaped portion having a first tab and a second tab, said first tab having a first remote end defining a first remote end width for applying a first retraction force and said second tab having a second remote end defining a second remote end width which is different from said first remote end width for applying a second retraction force which is different from said first retraction force thereby providing an asymmetrical friction pad retraction feature.

8. The brake shoe assembly according to claim 7, wherein said pad spring is formed from a flat strip of metal material.

9. The brake shoe assembly according to claim 7, wherein said pad spring permanently yields as the lining of the friction pad wears.

10. The brake shoe assembly according to claim 7, wherein said pad spring permanently yields and applies a corresponding decreasing rate of retraction force as the lining of the friction pad wears.

11. The brake shoe assembly according to claim 7, wherein said pad spring is carried by said friction pad in a symmetrical manner.

12. The brake shoe assembly according to claim 7, wherein said pad spring is carried by said friction pad with a portion of said spring spaced apart at an angle from contact an adjacent surface of said friction pad in a normal position when the brake is not actuated.

* * * * *